United States Patent [19]

Dehnert et al.

[11] 4,150,943
[45] Apr. 24, 1979

[54] UNIFORMLY DYED WATER-SWELLABLE CELLULOSIC FIBERS

[75] Inventors: Johannes Dehnert, Ludwigshafen; Günther Lamm, Hassloch; Werner Juenemann; Guenter Meyer, both of Ludwigshafen, all of Fed. Rep. of Germany

[73] Assignee: BASF Aktiengesellschaft, Fed. Rep. of Germany

[21] Appl. No.: 846,720

[22] Filed: Oct. 31, 1977

Related U.S. Application Data

[63] Continuation-in-part of Ser. No. 728,527, Oct. 1, 1976.

[30] Foreign Application Priority Data

Oct. 29, 1975 [AT] Austria ................................. 8223/75

[51] Int. Cl.² .................. C09B 27/00; C09B 29/22
[52] U.S. Cl. ........................................ 8/41 R; 8/21 C; 8/54.2; 8/93; 260/156
[58] Field of Search .................. 8/41 R, 54.2, 21 C, 8/93

[56] References Cited

U.S. PATENT DOCUMENTS

| | | | |
|---|---|---|---|
| 3,706,525 | 12/1972 | Blackwell et al. | 8/21 C |
| 3,853,895 | 12/1974 | Lamm et al. | 260/156 |
| 3,998,802 | 12/1976 | Dehnert et al. | 260/156 |
| 4,042,578 | 8/1977 | Dehnert et al. | 260/156 |
| 4,049,377 | 9/1977 | Schwab et al. | 8/21 C |

FOREIGN PATENT DOCUMENTS 2524243 12/1976 Fed. Rep. of Germany.

OTHER PUBLICATIONS

Venkataraman, K., "The Chemistry of Synthetic Dyes", vol. VIII, (Academic Press), 1978, pp. 179–180.

*Primary Examiner*—A. Lionel Clingman
*Attorney, Agent, or Firm*—Keil & Witherspoon

[57] ABSTRACT

Uniformly dyed water-swellable cellulosic fibers which are fast to washing, dry-cleaning, sublimation and light and have been produced by contacting water-swellable cellulose fibers sequentially or concomitantly with water, ethylene glycol or a derivative thereof and, while the fibers are still swollen, an essentially water-insoluble dye of the formula

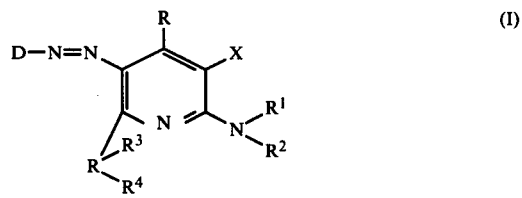

in which
D is the radical of a diazo component;
R is hydrogen, $C_1$ to $C_7$ alkyl, phenyl or phenyl bearing methyl as a substituent;
X is cyano, carbamoyl or substituted carbamoyl;
$R^1$ is hydrogen or an aliphatic, cycloaliphatic, araliphatic or aromatic radical;
$R^2$ is hydrogen or an aliphatic, cycloaliphatic or araliphatic radical;
$R^3$ and $R^4$ independently of one another have the same meanings as $R^1$ and $R^2$; and
$R^1$—N—$R^2$ and $R^3$—N—$R^4$ independently of one another are saturated heterocyclic radicals.

11 Claims, No Drawings

UNIFORMLY DYED WATER-SWELLABLE CELLULOSIC FIBERS

This application is a continuation-in-part of our copending application Ser. No. 728,527 filed Oct. 1, 1976.

The invention relates to uniformly dyed water-swellable cellulosic fibers which are fast to washing, drycleaning, sublimation and light and have been produced by contacting water-swellable cellulose fibers sequently or concomitantly with water, ethylene glycol or a derivative thereof and, while the fibers are still swollen, an essentially water-insoluble dye of the formula

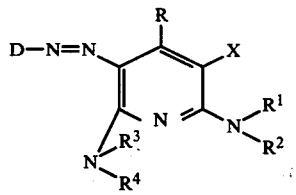

in which
D is the radical of a diazo component;
R is hydrogen, $C_1$ to $C_7$ alkyl, phenyl or phenyl bearing methyl as a substituent;
X is cyano, carbamoyl or substituted carbamoyl;
$R^1$ is hydrogen or an aliphatic, cycloaliphatic, araliphatic or aromatic radical;
$R^2$ is hydrogen or an aliphatic, cycloaliphatic or araliphatic radical;
$R^3$ and $R^4$ independently of one another have the same meanings as $R^1$ and $R^2$; and
$R^1$—N—$R^2$ and $R^3$—N—$R^4$ independently of one another are saturated heterocyclic radicals.

The radical D may be derived particularly from an amine of the benzene, naphthalene, benzothiazole, benzoisothiazole, thiazole, thiadiazole, indazole, pyrazole, thiophene, azobenzene, phthalimide, naphthalimide or anthraquinone series.

Examples of substituents of the radical of the diazo component D are: in the benzene series: fluoro, chloro, bromo, nitro, cyano, trifluoromethyl, methylsulfonyl, ethylsulfonyl, phenylsulfonyl, carboxylic esters such as $C_1$ to $C_8$ alkoxycarbonyl, phenoxycarbonyl, phenoxyethoxycarbonyl or β-$C_1$ to β-$C_4$ alkoxyethoxycarbonyl, optionally N-monosubstituted or N,N-disubstituted carbamoyl or sulfamoyl, methyl, ethyl, butyl, octyl, hexyl, methoxy or ethoxy and also carboxy. N-substituents of carbamoyl or sulfamoyl are for example methyl, ethyl, phenyl, benzyl, phenylethyl, cyclohexyl, norbornyl, propyl, butyl, β-hydroxyethyl, γ-hydroxypropyl, β-methoxyethyl, γ-methoxypropyl, γ-ethoxypropyl and also pyrrolidide, piperidide and morpholide.

In the azobenzene series: fluoro, chloro, bromo, nitro, cyano, trifluoromethyl, methyl, ethyl, carboxy, methoxy and ethoxy, the carboxylic esters, carbamoyl and sulfamoyl radicals referred to under the benzene series, and hydroxy.

In the heterocyclic series: chloro, bromo, nitro, cyano, methyl, ethyl, phenyl, methoxy, ethoxy, methylmercapto, β-carbomethoxyethylmercapto, β-carboethoxyethylmercapto, carbomethoxy, carboethoxy, acetyl, methylsulfonyl and ethylsulfonyl.

In the anthraquinone series: chloro, bromo, amino, acetyl, methyl, ethyl, phenylamino, tolylamino, hydroxy, methoxy, ethoxy, cyano and carboxy.

In the benzene and naphthalene series diazo components are preferred which have at least one substituent which decreases the basicity such as methylsulfonyl, phenylsulfonyl, ethylsulfonyl, carboxylic ester, optionally N-subtituted carbamoyl, chloro, bromo, trifluoromethyl and particularly cyano.

Radicals R other than hydrogen are for example ethyl, n-propyl, isopropyl, butyl, pentyl, α-ethylpentyl, phenyl or methylphenyl and preferably methyl.

Examples of $R^1$, other than hydrogen, are the following substituents: alkyl of one to eight carbon atoms, alkyl of two to eight carbon atoms, alkyl of two to eight carbon atoms bearing hydroxy, cyano, alkoxy or one to eight carbon atoms, phenoxy, phenoxyethoxy or benzyloxy as a substituent, cyclohexyl, norbornyl, benzyl, phenylethyl, phenylhydroxyethyl, phenylpropyl, phenylbutyl, phenyl, phenyl bearing chloro, methyl, trifluoromethyl, pyrrolidonyl, methoxy or ethoxy as a substituent, $C_5$ to $C_{12}$ polyalkoxyalkyl,
$C_4$ to $C_9$ hydroxypolyalkoxyalkyl,
$C_1$ to $C_8$ alkanoyloxy $C_2$ to $C_6$ alkyl,
$C_7$ to $C_{11}$ aroyloxy $C_2$ to $C_6$ alkyl,
$C_1$ to $C_8$ alkylaminocarbonyloxy $C_2$ to $C_6$ alkyl,
$C_6$ to $C_{10}$ arylaminocarbonyloxy $C_2$ to $C_6$ alkyl,
$C_1$ to $C_8$ alkoxycarbonyl $C_2$ to $C_7$ alkyl and
$C_1$ to $C_{18}$ alkanoyl, $C_8$ to $C_{10}$ aralkanoyl, $C_7$ to $C_{11}$ aroyl,
$C_1$ to $C_4$ alkylsulfonyl and $C_6$ to $C_{10}$ arylsulfonyl.

In addition to those already specified, the following are specific examples of suitable radicals $R^1$:
1: unsubstituted or substituted alkyl:
$CH_3$, $C_2H_5$, n- and i-$C_3H_7$, n- and i-$C_4H_9$, $C_6H_{13}$,

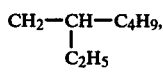

$CH_2CH_2OH$, $(CH_2)_3OH$,

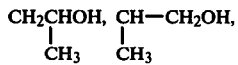

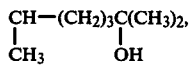

$(CH_2)_2O(CH_2)_2OH$, $(CH_2)_3O(CH_2)_4OH$, $(CH_2)_3O(CH_2)_2OH$, $(CH_2)_2CN$, $(CH_2)_5CN$, $(CH_2)_6CN$, $(CH_2)_7CN$, $(CH_2)_2O(CH_2)_2CN$, $(CH_2)_3O(CH_2)_2CN$, $(CH_2)_2O(CH_2)_2O(CH_2)_2CN$, $(CH_2)_3OC_2H_4OCH_3$, $(CH_2)_3OC_2H_4OC_2H_5$, $(CH_2)_3O(CH_2)_6OH$, $(CH_2)_3OC_2H_4OCH(CH_3)_2$, $(CH_2)_3OC_2H_4OC_4H_9$, $(CH_2)_3OC_2H_4OCH_2C_6H_5$, $(CH_2)_3OC_2H_4OC_2H_4C_6H_5$,

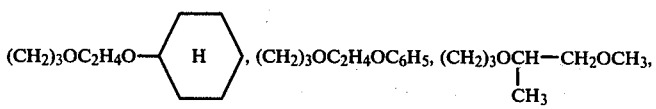

-continued (CH$_2$)$_3$OCHCH$_2$OC$_4$H$_9$, (CH$_2$)$_3$OCH$_2$CHOCH$_3$, (CH$_2$)$_3$OCHCH$_2$OC$_2$H$_5$,
            |                                    |                                    |
           CH$_3$                               CH$_3$                               CH$_3$ CH$_2$CH$_2$COOH, (CH$_2$)$_5$COOH, (CH$_2$)$_6$COOH,
the corresponding radicals in which the groupings:

—O(CH$_2$)$_2$—, —OCH$_2$CH— or —OCH—CH$_2$—
                        |                    |
                       CH$_3$                CH$_3$ are present two or three times;

CH$_2$CH$_2$OCH$_3$, CH$_2$CH$_2$OC$_2$H$_5$, CH$_2$CH$_2$OC$_3$H$_7$, CH$_2$CH$_2$OC$_4$H$_9$, CH$_2$CH$_2$OC$_6$H$_5$, (CH$_2$)$_3$OCH$_3$, (CH$_2$)$_3$OC$_2$H$_5$, (CH$_2$)$_3$OC$_4$H$_9$, (CH$_2$)$_3$OCH$_2$CHC$_4$H$_9$,
         |
        C$_5$H$_5$ (CH$_2$)$_3$OC$_3$H$_7$, (CH$_2$)$_3$OC$_6$H$_{13}$, (CH$_2$)$_3$OC$_8$H$_{17}$, (CH$_2$)$_3$O—, (CH$_2$)$_3$OCH$_2$C$_6$H$_5$, (CH$_2$)$_3$OC$_2$H$_4$C$_6$H$_5$, (CH$_2$)$_3$OC$_6$H$_5$,

—CHCH$_2$OCH$_3$, CHCH$_2$OC$_4$H$_9$, CHCH$_2$OC$_6$H$_5$,
       |                |                    |
      CH$_3$           CH$_3$                CH$_3$
CHCH$_2$OCH$_2$C$_6$H$_5$, CH$_2$CHOCH$_3$,
       |                         |
      CH$_3$                    CH$_3$
CH$_2$CH—OC$_2$H$_5$, CH$_2$CH—OC$_4$H$_9$,
       |                    |
      CH$_3$               CH$_3$
CH$_2$CH—OC$_2$H$_4$C$_6$H$_5$,
       |
      CH$_3$

CH$_2$CH—OC$_6$H$_5$, CH$_2$—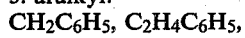—CH$_2$OH;
       |
      CH$_3$ 2. unsubstituted or substituted cycloalkyl and polycycloalkyl:

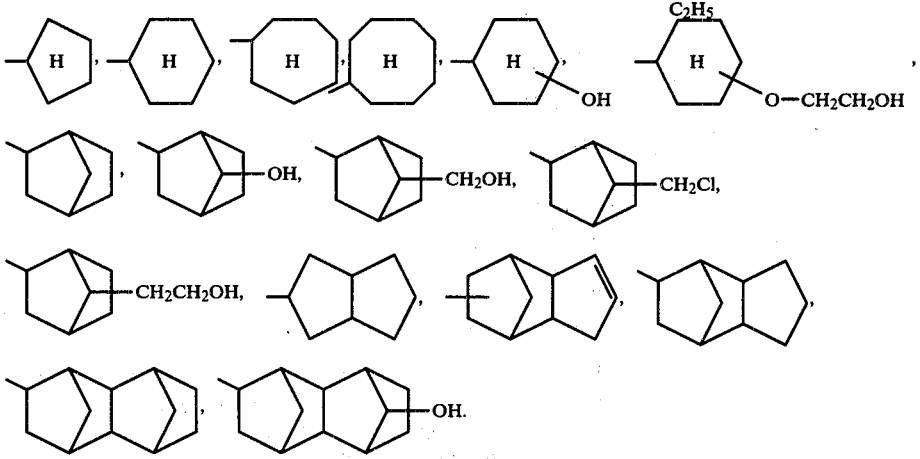

3. aralkyl:
CH$_2$C$_6$H$_5$, C$_2$H$_4$C$_6$H$_5$,

CH$_2$CH—C$_6$H$_5$, CH$_2$CH$_2$CHC$_6$H$_5$, CH$_2$CH—C$_6$H$_5$,
       |                    |                      |
      CH$_3$               CH$_3$                  OH as well as C$_6$H$_4$CH$_3$ instead of C$_6$H$_5$;
4. unsubstituted or substituted phenyl;

C$_6$H$_5$, C$_6$H$_4$CH$_3$, C$_6$H$_3$(CH$_3$)$_2$, C$_6$H$_4$OCH$_3$, C$_6$H$_4$OC$_2$H$_5$, C$_6$H$_4$OCH$_2$CH$_2$OH or C$_6$H$_4$Cl;

5. The radicals CH$_2$CH=CH$_2$, CH$_2$COOCH$_3$, (CH$_2$)$_5$COOCH$_3$, (CH$_2$)$_5$COOC$_2$H$_5$, (CH$_2$)$_5$COOC$_4$H$_9$,

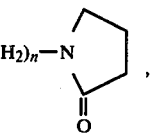

C$_2$H$_5$
                         |
(CH$_2$)$_5$COOCH$_2$CH              (CH$_2$)$_n$—N
                         |
                        C$_4$H$_9$                   ║
                                                    O n being 2, 3, 4 or 6.

6. acyloxy: (CH$_2$)$_2$OCHO, (CH$_2$)$_2$OCOCH$_3$, (C$_2$H$_4$O)$_2$CHO, (C$_2$H$_4$O)$_2$COCH$_3$, (CH$_2$)$_2$OCOC$_3$H$_7$,

C$_2$H$_5$
(CH$_2$)$_2$OCOCH
                    C$_4$H$_9$         , (CH$_2$)$_2$OCOC$_6$H$_5$,          (CH$_2$)$_2$OCOC$_6$H$_4$CH$_3$,
(CH$_2$)$_2$OCOC$_6$H$_4$Cl,         (CH$_2$)$_2$OCOC$_{10}$H$_7$,
(CH$_2$)$_2$OCONHCH$_3$, (CH$_2$)$_2$OCONHC$_4$H$_9$,

C$_2$H$_5$
                          |
(CH$_2$)OCONHCH$_2$CH ,
                          |
                         C$_4$H$_9$ (CH$_2$)$_2$OCONHC$_6$H$_5$,   (CH$_2$)$_2$OCONHC$_6$H$_4$Cl, (CH$_2$)$_2$OCONHC$_6$H$_3$Cl$_2$, and the corresponding radicals with (CH$_2$)$_3$; (CH$_2$)$_4$ or (CH$_2$)$_6$ in each case.

7. acyl:
CHO, CH$_3$CO, C$_2$H$_5$CO, C$_3$H$_7$CO,

C$_4$H$_9$CH—CO,
       |
      C$_2$H$_5$

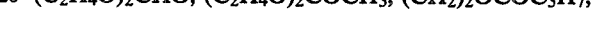

C$_2$H$_5$CO, CH$_3$C$_6$H$_4$CO, C$_6$H$_5$CH$_2$CO, C$_6$H$_5$OCH$_2$CO, CH$_3$SO$_2$, C$_2$H$_5$SO$_2$, C$_6$H$_5$SO$_2$ and CH$_3$C$_6$H$_4$SO$_2$.
Examples of preferred substituents are hydrogen, CH$_3$, C$_2$H$_5$, n- and i-C$_3$H$_7$, n- and i-C$_4$H$_9$, C$_6$H$_{13}$, CH$_2$CH$_2$OH, (CH$_2$)$_3$OH, $$\text{CH}_2\text{CHOH},$$
$$\phantom{\text{CH}_2}|$$
$$\phantom{\text{CH}_2\text{CHO}}\text{CH}_3$$

$(\text{CH}_2)_4\text{OH}, (\text{CH}_2)_6\text{OH},$ $$\text{CH}(\text{CH}_2)_3\text{C}(\text{CH}_3)_2,$$
$$|\phantom{(\text{CH}_2)_3\text{C}}|$$
$$\text{CH}_3\phantom{(\text{CH}_2)_3}\text{OH}$$

$(\text{CH}_2)_2\text{O}(\text{CH}_2)_2\text{OH},\quad (\text{CH}_2)_3\text{O}(\text{CH}_2)_2\text{OH},$
$(\text{CH}_2)_3\text{O}(\text{CH}_2)_4\text{OH}, (\text{CH}_2)_3\text{O}(\text{CH}_2)_6\text{OH},$

—⟨H⟩—OH,

—⟨H⟩—O—CH₂CH₂OH, CH₂CH—⟨phenyl⟩,
$\phantom{xxxxxxxxxxxxxxxxxxxxxxxxxxxx}|$
$\phantom{xxxxxxxxxxxxxxxxxxxxxxxxxxxx}\text{OH}$ $(\text{CH}_2)_n$—N⟨ring⟩  $(n=2,3,6)$,
$\phantom{xxxxxxx}\|$
$\phantom{xxxxxxx}\text{O}$ $\text{CH}_2\text{CH}_2\text{OCH}_3,\quad \text{CH}_2\text{CH}_2\text{OC}_2\text{H}_5,\quad \text{CH}_2\text{CH}_2\text{OC}_4\text{H}_9,$
$(\text{CH}_2)_3\text{OCH}_3,\quad\phantom{x} (\text{CH}_2)_3\text{OC}_2\text{H}_5,\quad\phantom{x} (\text{CH}_2)_3\text{OC}_3\text{H}_7,$
$(\text{CH}_2)_3\text{OC}_4\text{H}_9,$ $(\text{CH}_2)_3$—O—⟨H⟩, $(\text{CH}_2)_3\text{OCH}_2$—⟨phenyl⟩

$(\text{CH}_2)_3\text{O}$—⟨phenyl⟩, $(\text{CH}_2)_2\text{O}$—⟨phenyl⟩, $(\text{CH}_2)_3\text{OC}_2\text{H}_4\text{OCH}_3, (\text{CH}_2)_3\text{OC}_2\text{H}_4\text{OC}_4\text{H}_9,$ $(\text{CH}_2)_3\text{OC}_2\text{H}_4\text{OC}_6\text{H}_5,$—⟨H⟩, —⟨norbornyl⟩, $\text{CH}_2\text{C}_6\text{H}_5, \text{C}_2\text{H}_4\text{C}_6\text{H}_5, \text{CH}_2\text{CHC}_6\text{H}_5,$
$\phantom{xxxxxxxxxxxxxxxxxx}|$
$\phantom{xxxxxxxxxxxxxxxxxx}\text{CH}_3$ $\text{C}_6\text{H}_5, \text{C}_6\text{H}_4\text{CH}_3, \text{C}_6\text{H}_4\text{OCH}_3, \text{C}_6\text{H}_4\text{OC}_2\text{H}_4\text{OH}$ and $(\text{CH}_2)_5\text{COOH}$. Examples of radicals $R^1$—N—$R^2$ and $R^3$—N—$R^4$ are: pyrrolidino, piperidino, morpholino, piperazino and hexamethyleneimino.

Dyes of the formula (I) may be prepared by reacting a diazo compound of an amine of the formula (II):

$$\text{D—NH}_2 \qquad (II)$$

with a coupling component of the formula (III):

$$\begin{array}{c}R\\ \diagup\\ \text{pyridine ring with }X\\ R^3\diagup\phantom{xx}\diagdown R^1\\ R^4\phantom{xxxxxx}R^2\end{array} \qquad (III)$$

in which D, R, X, and $R^1$ to $R^4$ have the above meanings.

The amines are diazotized by the usual methods. Coupling is also carried out as usual in an aqueous medium, with or without the addition of a solvent, at a strongly acid to weakly acid pH.

The uniformly dyed fibers of the invention are preferentially obtained with dye formulations which contain, in addition to conventional dispersing agents, water retention agents and water, a dye of the formula (I) in which:

D is phenyl substituted by cyano, trifluoromethyl, methyl, fluoro, chloro, bromo, $C_1$ to $C_4$ alkylsulfonyl, phenylsulfonyl, $$-\text{SO}_2\text{N}\diagdown\begin{array}{c}R^1\\ R^2\end{array} \text{ or } -\text{CON}\diagdown\begin{array}{c}R^1\\ R^2\end{array};$$

[diazo structure with $T^3, T^4, T^1, T^2, T^4$ substituents and N=N linkage between two phenyl rings];

[phthalimide-type structure with $T^4$, N—$R^1$];

[phthalimide-type structure with $T^5$, NC, N—$R^1$];

anthraquinonyl; anthraquinonyl substituted by methyl, chloro, bromo or carboxyl; or benzoisothiazolyl substituted by nitro, chloro or bromo;

R is hydrogen, $C_1$ to $C_3$ alkyl or phenyl;

X is cyano, carbamoyl or $$\text{CON}\diagdown\begin{array}{c}R^1\\ R^2\end{array};$$

$R^1$ and $R^3$ independently of one another are hydrogen;

$C_1$ to $C_8$ alkyl; $C_2$ to $C_8$ alkyl substituted by hydroxy, $C_1$ to $C_8$ alkoxy, phenoxy, tolyloxy, cyclohexyloxy, benzyloxy, β-phenylethoxy, carboxyl, carboxylic ester with a total of 2 to 9 carbon atoms, carboxylic acyloxy with a total of 1 to 11 carbon atoms, $C_1$ to $C_8$ alkylaminocarbonyloxy, benzoylaminocarbonyloxy, tolylaminocarbonyloxy, chlorophenylaminocarbonyloxy, dichlorophenylaminocarbonyloxy or pyrrolidonyl; cyclohexyl; norbornyl; phenyl-$C_1$ to $C_4$-alkyl; tolyl-$C_1$ to $C_4$-alkyl; β-phenyl-β-hydroxy-ethyl; phenyl; phenyl substituted by fluoro, chloro, bromo, methyl, trifluoromethyl, ethyl, methoxy, ethoxy or pyrrolidonyl; $\text{CH}_2\text{CH}_2\text{OCH}_2\text{CH}_2\text{OH}$; or $(\text{CH}_2)_3(\text{OC}_2\text{H}_4)_n\text{OB}$;

n is zero, 1 or 2;

B is hydrogen, $C_1$ to $C_4$ alkyl, cyclohexyl, benzyl, phenylethyl, phenyl or tolyl;

R² and R⁴ independently of one another are hydrogen or $C_1$ to $C_4$ alkyl;

R¹ and R² together with the nitrogen are pyrrolidino, piperidino, morpholino or hexamethyleneimino;

T¹ is hydrogen, chloro, bromo or methyl;

T² is hydrogen or methyl;

T³ is hydrogen,

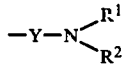

or COOB¹;

B¹ is hydrogen, $C_1$ to $C_8$ alkyl, phenyl-$C_1$ to $C_4$-alkyl or $(OC_2H_4)_nOB$;

Y is —SO₂— or —CO—;

T⁴ is hydrogen or chloro; and

T⁵ is hydrogen, methyl or ethyl.

Dye formulations which contain a dye or dye mixture of the formula (Ia):

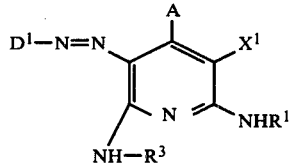

in which

D¹ is a diazo component devoid of nitro groups of the benzene, phthalimide, naphthalimide, anthraquinone or azobenzene series or a nitrobenzoisothiazolyl radical;

A is hydrogen or $C_1$ to $C_3$ alkyl; and

X¹ is cyano or carbamoyl; and

R¹ and R³ have the meanings given above, are particularly important industrially.

The substituents are conveniently chosen so that the molecule contains either in the diazo component or in the coupling component at least one aryl radical and preferably a phenyl radical.

We have special preference for A to be methyl and X¹ to be cyano and also for the combination A=H and X¹=CONH₂.

Dyes are moreover preferred in which at least one of the radicals R¹ and R³ contains an oxygen-containing amine radical, preferably the radical of one of the amines: phenoxyethoxypropylamine, phenoxyethoxyethoxypropylamine, benzyloxypropylamine, phenylethoxypropylamine, butoxyethoxypropylamine, benzoyloxyethylamine, benzoyloxypropylamine, benzoyloxyethoxyethylamine, H₂N(CH₂)₃O(CH₂)₄OCOC₆H₅, H₂N(CH₂)₂OCONHC₆H₅, H₂N(CH₂)₃OCONHC₆H₅ and H₂N(CH₂)OCONHC₆H₄Cl and the combination of one of these radicals with phenylamino or amino. The radical D¹ may be derived for example specifically from the following amines: o-cyanoaniline, m-cyanoaniline, p-cyanoaniline, 2,4-dicyanoaniline, 2,4,6-tribromoaniline, 2,4-dichloroaniline, 2-cyano-4,6-dibromoaniline, 2,4-dicyano-6-bromoaniline, 4-cyano-2-chloroaniline, 1-amino-2-trifluoromethyl-4-chlorobenzene, 2-chloro-5-aminobenzonitrile, 2-amino-5-chlorobenzonitrile, 1-aminobenzene-4-methylsulfone, 1-amino-2,6-dibromobenzene-4-methylsulfone, 1-amino-2-chloro-4-methylsulfone, 1-amino-2,6-dichlorobenzene-4-methylsulfone, propyl 3,5-dichloroanthranilate, β-methoxyethyl 3,5-dibromoanthranilate, 4-aminoacetophenone, 4-aminobenzophenone, 2-aminobenzophenone, 2-aminodiphenylsulfone, 4-aminodiphenylsulfone, 3-aminophthal-β-hydroxyethylimide, 4-aminophthalic phenylimide or p-tolylimide, 3-amino-6-chlorophthalimide and its N-substitution products, 3-amino-4-cyano-5-methylphthalimide and 3-amino-4-cyano-5-ethylphthalimide and their N-substitution products, 1-amino-2-chloroanthraquinone, 1-amino-2-bromoanthraquinone, 1-amino-2,4-dibromoanthraquinone, 1-amino-2-acetyl-4-chloroanthraquinone, 1-aminoanthraquinone-6-carboxylic acid, its ethyl ester, the ethyl ester of 1-aminoanthraquinone-6-carboxylic acid, 1-amino-4-methoxyanthraquinone, 1-amino-4-hydroxyanthraquinone, 1-amino-2-chloro-4-p-toluidinoanthraquinone, 2-amino-1-chloroanthraquinone, 2-amino-3-chloroanthraquinone, 2-amino-3-bromoanthraquinone, 2-amino-1,3-dibromoanthraquinone, 2-amino-1-cyano-3-bromoanthraquinone, 1-aminobenzanthrone, 6-aminobenzanthrone, 7-aminobenzanthrone, 1-aminoanthraquinone, 2-aminoanthraquinone, 1-amino-4-chloroanthraquinone, 2,4-dicyano-3,5-dimethylaniline, the imide, methylimide, n-butylimide, 2-hydroxyethylimide, 3'-methoxypropylimide or phenylimide of 4-aminonaphthalic acid, 5-nitro-3-aminobenzoisothiazole-(2,1) or 5-nitro-7-bromo-3-aminobenzoisothiazole-(2,1).

Examples of suitable diazo components of the aminoazobenzene series are: 4-aminoazobenzene, 3-chloro-4-aminoazobenzene, 3-bromo-4-aminoazobenzene, 2',3-dimethyl-4-aminoazobenzene, 3',2-dimethyl-4-aminoazobenzene, 2,5-dimethyl-4-aminoazobenzene, 2-methyl-5-methoxy-4-aminoazobenzene, 2-methyl-4',5-dimethoxy-4-aminoazobenzene, 4'-chloro-2-methyl-5-methoxy-4-aminoazobenzene, 4'-chloro-2-methyl-4-aminoazobenzene, 2,5-dimethoxy-4-aminoazobenzene, 4'-chloro-2,5-dimethoxy-4-aminoazobenzene, 4'-chloro-2,5-dimethyl-4-aminoazobenzene, 4'-methoxy-2,5-dimethyl-5-aminoazobenzene, 3,5-dibromo-4-aminoazobenzene, 2,3'-dichloro-4-aminoazobenzene, 3-methoxy-4-aminoazobenzene, 2',3-dimethyl-5-bromo-4-azobenzene, 4'-amino-2',5'-dimethylazobenzene-4-sulfonic amide, 4'-amino-2',5'-dimethylazobenzene-4-sulfonic amide and the aminoazobenzenes of the formula:

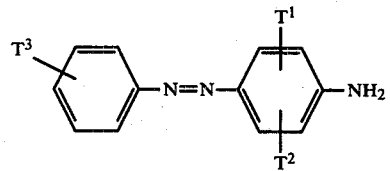

in which

T¹ is hydrogen, chloro, bromo or methyl;

T² is hydrogen or methyl; and

T³ is a radical of the formula

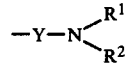

or —COOB¹ where

Y is CO or SO₂ and B¹ is an alcohol radical and R¹ and R² have the meanings given above.

The dyes of the formula (I) may from their constitution be termed disperse dyes whose application for example to cotton is not as a rule possible. A process is described however in U.S. Pat. No. 3,706,525 which makes printing on cellulose and cellulosic textile material possible. Details given therein concerning process conditions are applicable to the dyes of the present invention. Other methods are specified in our copending application Ser. No. 691,496 according to which the dyes according to formula I may be applied. Printing processes are preferred. The above patent and application are incorporated herein by reference.

The dyes according to formula I give dyeings and prints having excellent fastness properties among which wet fastnesses (particularly fastness to washing, water, perspiration and sea water) and in some cases lightfastness may be emphasized. In the case of prints for example no staining of any white ground present occurs in washing.

In the following Examples, which illustrate the invention, parts and percentages are by weight unless specified otherwise.

EXAMPLE 1

Cotton cloth is printed by a rotary screen printing method with an ink consisting of 10 parts of the dye of the formula:

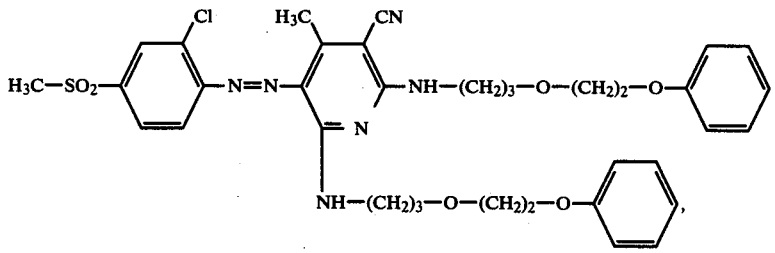

100 parts of polyethylene oxide of a molecular weight of 300 to 790 parts of a 3% alginate thickening and the print is dried at 100° C. The print is then treated for one minute at 200° C. with hot air, rinsed cold, soaped at the boil, again rinsed cold and dried. A light-fast and washfast yellow orange print is obtained on a white ground.

EXAMPLE 2

A cloth from a blend of polyester and cotton (ratio by weight 67:35) is printed with a paste consisting of 20 parts of the dye of the formula

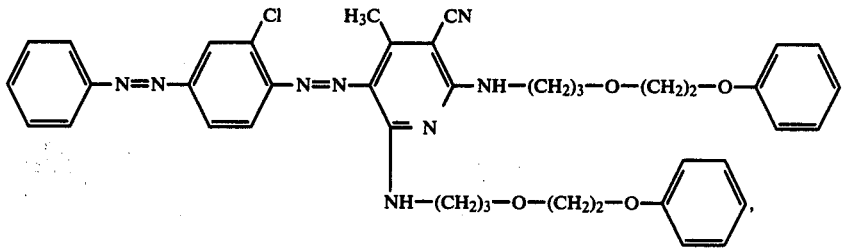

120 parts of the reaction product from polyethylene oxide having a molecular weight of 300 with boric acid in the molar ratio 3:1 and 860 parts of a 10% alginate thickening. The print is dried at 105° C. and treated for six minutes at 180° C. with superheated steam. The print is then rinsed with cold water, soaped at 80° C., again rinsed cold and dried.

A red print which is fast to light and washing is obtained on a white ground.

EXAMPLE 3

A cotton cloth is printed by the roller printing method with a print paste consisting of 15 parts of the dye of the formula:

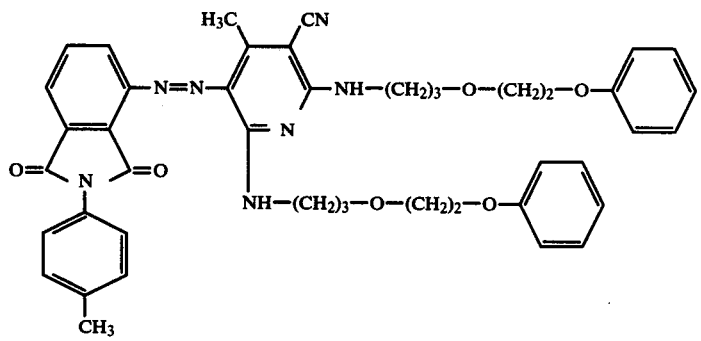

110 parts of polyethylene oxide of the molecular weight 350, 30 parts of the diethanolamide of oleic acid and 845 parts of a 10% alginate thickening. The print is dried at 100° C. and then fixed by a treatment with hot air for one minute at 195° C. The print is finished off as described in Example 1 and a fast orange print is obtained on a white ground.

EXAMPLE 4

Cloth of a blend of polyester and cellulose (ratio by weight 67:35) is printed on a screen printing machine with an ink consisting of 30 parts of the dye of the formula:

and 970 parts of a 10% alginate thickening. After the print has been dried at 105° C. it is treated for seven

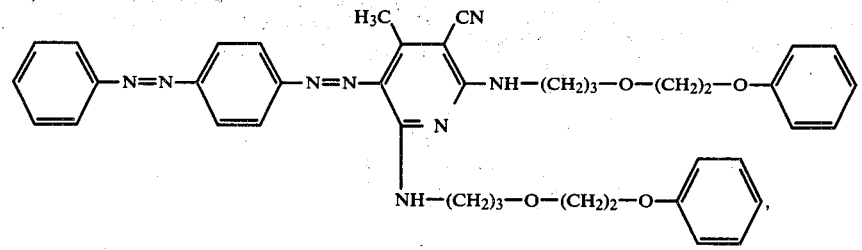

100 parts of the reaction product of polyethylene oxide of the molecular weight 300 with boric acid in the molar ratio 3:1, 30 parts of the diethanolamide of oleic acid and 840 parts of a 3% alginate thickening and the print is dried at 110°. It is then treated for five minutes at 185° C. with superheated steam and finished off as described in Example 2. A fast scarlet print on a white ground is obtained.

EXAMPLE 5

Cotton cloth is padded on a padding mangle with a solution containing 20 parts of the dye of the formula:

minutes at 185° C. with superheated steam and finished off by rinsing and soaping as described in Example 1.

A fast red print on a white ground is obtained.

The dyes specified in the following Examples may be converted as follows into a commercial dye formulation:

30 parts of dye,
6 parts of dispersing agent,
10 parts of a water retention agent,
1 part of a disinfectant and
about 53 parts of water

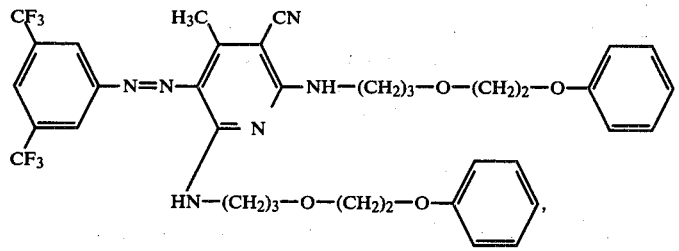

300 parts of a 3% alginate thickening, 550 parts of water and 130 parts of polyethylene oxide of the molecular weight 300. The cloth should take up 80% liquor. It is dried at 100° C. To fix the dye it is treated for five minutes with superheated steam at 190° C. The cloth is then rinsed cold, washed at 90° C. in a liquor containing 3 parts of the condensation product of a long chain alcohol with ethylene oxide to 997 parts of water.

A yellow dyeing is obtained.

Cloth of a blend of polyester and cotton in the ratio by weight 67:33 may be padded with the said solution instead of cotton cloth. A yellow dyeing is obtained in which the two phases are equal in tone. Fixation with hot air at 195° C. may also be carried out instead of the treatment with superheated steam.

EXAMPLE 6

Cotton cloth is padded on a padding mangle with a solution of 150 parts of polyethylene oxide in 850 parts of water so that the wet pickup is 80% and the padded cloth is dried at 100° C. The cloth treated in this way is printed by the rotary screen printing method with a color consisting of 30 parts of the dye of the formula:

are ground in an agitator mill to a particle size of about 0.5 micron. A dispersion of the dye is thus obtained which is stable in storage.

EXAMPLE 7

20 Parts of 4-aminoazobenzene is stirred overnight with 80 parts by volume of 5 N hydrochloric acid. Then it is diluted with ice and water to a volume of 500 parts by volume at 10° C. 30 parts by volume of a 23% sodium nitrite solution is added and the whole is stirred for two hours at 15° C. The filtrate, in which excess nitrous acid has been removed in the conventional manner by adding sulfamic acid, is allowed to flow into a solution of 53 parts of 2,6-bis(phenoxyethoxypropylamino)-3-cyano-4-methylpyridine in 4000 parts by volume of dimethylformamide at 15° C. 150 parts by volume of a 50% aqueous sodium acetate solution is then added to this coupling mixture and the whole is stirred at 15° C. until coupling is completed. The dye formed is suction filtered, washed first with alcohol and then with hot water and dried at 90° C. A red powder is obtained which readily dissolves in dimethylformamide and polyethylene glycols with a yellowish red color

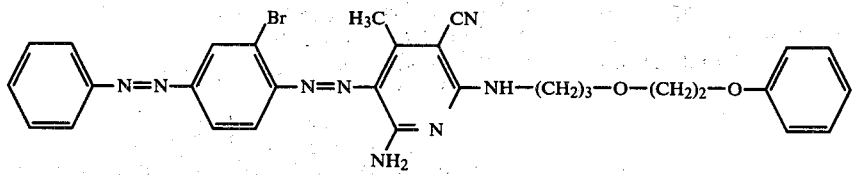

and when printed in the form of these solutions or as an aqueous dispersion on cloth of polyester or cotton or a blend of the two types of fiber and aftertreated with hot air or superheated steam gives deep and clear scarlet hues.

EXAMPLE 8

35 parts of 3-chloro-4-aminoazobenzene is stirred overnight with 7 parts of an oxyethylated sperm oil alcohol containing about 23 ethylene oxide radicals and 120 parts by volume of 5 N hydrochloric acid. A volume of 750 parts by volume and a temperature of 10° C. are set up with ice and water and 450 parts by volume of a 23% aqueous sodium nitrite solution is introduced. After stirring for two hours at 15° C. a small amount of insoluble matter is filtered off and nitrous acid is removed in the usual way by adding an aqueous solution of sulfamic acid.

The diazonium salt solution thus obtained is then allowed to flow at 10° C. into 385 parts by volume of an isobutanol solution containing 0.16 mole of 2,6-bis-(phenoxyethoxypropylamino)-3-cyano-4-methylpyridine. Complete coupling is achieved after stirring for several hours at 15° to 25° C. without adding the usual acid-binding agents. The dye formed is suction filtered, washed first with 100 parts by volume of isobutanol and then with 100 parts of hot water and then dried at 100° C.

The product which is in the form of a red powder may as an aqueous dispersion or dissolved in a polyethylene glycol be printed on cloth of polyester, cotton or a blend of both types of fiber and aftertreated with hot air or superheated steam. Deep and clear red hues of very good light and wet fastness properties are thus obtained.

EXAMPLE 9

The procedure described in Example 8 is adopted but the coupling component used is 0.15 mole of the substance having the formula:

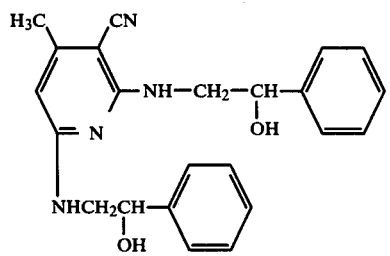

dissolved in 8000 parts by volume of dimethylformamide. The red powder obtained after isolation and drying dissolves in dimethylformamide and polyethylene glycols with a yellowish red color. Deep and clear scarlet hues with very good fastness properties are obtained on cloth of polyester, cotton or blends of the two.

Red hues having similar tinctorial properties are obtained in an analogous manner with the same diazo components and the following coupling components:

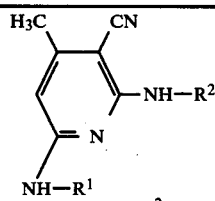

| Ex. | R$^1$ | R$^2$ |
|---|---|---|
| 10 | H | 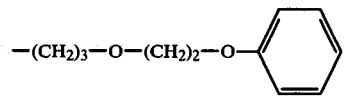 —(CH$_2$)$_3$—O—(CH$_2$)$_2$—O— |
| 11 | 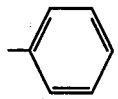 | " |
| 12 | 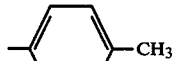 —CH$_3$ | " |
| 13 | 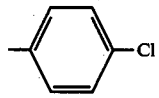 —Cl | " |
| 14 | —CH$_2$—CH$_2$— 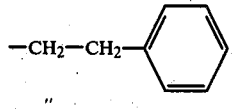 | " |
| 15 | " | 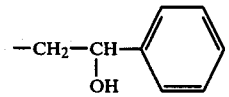 —CH$_2$—CH(OH)— |
| 16 | 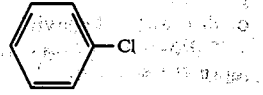 —Cl | " |

-continued

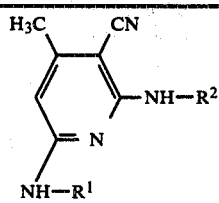

| Ex. | R¹ | R² |
|---|---|---|
| 17 | 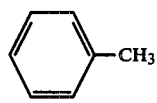 | " |
| 18 | 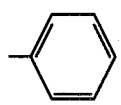 | " |
| 19 | —(CH₂)₃—O—CH₂—⌬ | —(CH₂)₃—O—CH₂—⌬ |
| 20 | (CH₂)₃—O—CH₂—CH₂—⌬ | —(CH₂)₃—O—CH₂—CH₂—⌬ |
| 21 | —(CH₂)₃—O—(CH₂)₂—O—(CH₂)₂O—⌬ | —(CH₂)₃—O—(CH₂)₂—O—(CH₂)₂—O—⌬ |
| 22 | H | " |

EXAMPLE 23

16 Parts of o-trifluoromethylaniline is dissolved in 30 parts by volume of 10 N hydrochloric acid and 200 parts of water, 200 parts of ice is added and then 30 parts by volume of a 23% aqueous solution of sodium nitrite is allowed to flow in below the surface. After stirring for half an hour at 0° to 5° C. the excess of nitrous acid is destroyed as usual by adding an aqueous solution of sulfamic acid.

The solution of the diazonium salt thus obtained is gradually added at 5° to 10° C. to a solution of 54 parts of bis-(phenoxyethoxypropylamino)-3-cyano-4-methylpyridine in 1000 parts by volume of dimethylformamide and then 32 parts by volume of a 50% aqueous sodium acetate solution is added. When coupling is over the yellow dye formed is suction filtered, washed first with alcohol and then with hot water and dried at 100° C. The yellow powder thus obtained dissolves in dimethylformamide or polyglycols with a pure yellow color and when printed on to cloth of cotton, polyester or blends of both and fixed gives deep and clear yellow hues with very good fastness properties.

The following dyes are obtained in a similar manner with the same coupling components:

| Ex. | Diazo Component | Hue on cotton and polyester |
|---|---|---|
| 24 | m-trifluoromethylaniline | yellow |
| 25 | 4-chloro-2-trifluoromethylaniline | " |
| 26 | 2-cyanoaniline | " |
| 27 | 4-chloro-2-cyanoaniline | " |
| 28 | 2,4-dicyanoaniline | yellowish orange |
| 29 | 2-chloroaniline-4-methylsulfone | reddish yellow |
| 30 | 2-aminodiphenylsulfone | reddish yellow |
| 31 | 3-aminophthalic hydroxyethylimide | yellowish orange |

EXAMPLE 32

25.3 Parts of the p-tolylimide of 3-aminophthalic acid is introduced at 15° to 25° C. into 60 parts of 96% sulfuric acid while stirring. The mixture is further stirred at the same temperature until complete solution has taken place. Then 32 parts (0.1 mole) of nitrosylsulfuric acid is allowed to flow in slowly at 0° to 5° C. and the diazotization mixture is stirred for another thirty minutes at 0° to 5° C. and then introduced into a mixture of 125 parts of ice and 25 parts of ice-water.

After the excess of nitrite has been destroyed with sulfamic acid the diazonium salt is stirred while 300 parts by volume of isobutanol and 110 parts by volume of a 10-molar solution of 2,6-bis(phenoxyethoxypropylamino)-3-cyano-4-methylpyridine in isobutanol are introduced. After coupling is over the dye formed is suction filtered, washed first with isobutanol and then with hot water and dried at 100° C. The reddish powder thus obtained dissolves in polyglycols with a reddish yellow color and gives deep orange hues with very good fastness properties on polyester, cotton or blends of the two after having been printed and fixed.

The following dyes may be obtained by similar methods with the same coupling components:

| Ex. | Diazo components | Hue on polyester and cotton |
|---|---|---|
| 33 | 1-aminoanthraquinone | brown |
| 34 | 1-aminoanthraquinone-6-carboxylic acid | brown |
| 35 | 1-amino-2-chloroanthraquinone | brown |
| 36 | 1-amino-2-bromoanthraquinone | brown |
| 37 | 1-amino-2,4-dichloroanthraquinone | brown |
| 38 | 4-amino-3-methoxybenzanthrone | brown |
| 39 | 2-aminoanthraquinone | red |
| 40 | 2-amino-3-chloroanthraquinone | red |
| 41 | 2-amino-1-chloroanthraquinone | red |
| 42 | 2-amino-2-cyano-3-bromoanthraquinone | red |
| 43 | 2-amino-3-bromoanthraquinone | red |
| 44 | 1-aminobenzanthrone | reddish violet |
| 45 | 5-nitro-3-aminobenzoisothiazole-(2,3) | bluish violet |
| 46 | 5-nitro-2-aminothiazole | reddish violet |

The following dyes are obtainable according to the processes of the foregoing Examples:

| Ex. | Diazo components | Coupling components | Hue |
|---|---|---|---|
| 47 | [phthalimide with N-phenyl and NH₂] | [pyridine with CH₃, CO—NH—CH₂—CH₂—CH₂—O—CH₃, NH—CH₂—CH₂—CH₂—O—CH₃, NH—CH₂—CH₂—CH₂—O—CH₃] | scarlet |
| 48 | C₆H₅—N=N—C₆H₄—NH₂ | " | red |
| 49 | C₆H₅—N=N—C₆H₃(Cl)—NH₂ | " | ruby |
| 50 | [naphthalimide with N-(p-tolyl) and NH₂] | " | reddish violet |
| 51 | [2-CH₃-C₆H₄—N=N—C₆H₃(CH₃)—NH₂] | [pyridine with CH₃, CN, NH—(CH₂)₃—O—(CH₂)₂—O—C₆H₅, NH—(CH₂)₃—O—(CH₂)₂—O—C₆H₅] | red |
| 52 | [3-CH₃-C₆H₄—N=N—C₆H₃(CH₃)—NH₂] | " | red |
| 53 | [2,5-dibromo-6-cyano-aniline] | " | orange |
| 54 | [2-CH₃-C₆H₄—N=N—C₆H₃(CH₃)—NH₂] | [pyridine with CH₃, CN, NH₂, NH—(CH₂)₃—O—(CH₂)₂—O—C₆H₅] | reddish orange |

-continued

| Ex. No. | Structure | Hue |
|---|---|---|
| 55 | 4-methylphenyl–N=N–(2-methyl-4-amino)phenyl | reddish orange |
| 56 | phenyl–N=N–(3-bromo-4-amino)phenyl | scarlet |
| 57 | 4-amino-N-(p-tolyl)phthalimide | yellowish orange |
| 58 | N-(3-methoxypropyl)-4-amino-1,8-naphthalimide | red |

$$D-N=N-\underset{\underset{NH-CH_2CH_2CH_2OCH_2CH_2OC_6H_5}{|}}{\overset{R^1}{\underset{|}{C}}=\overset{X}{\underset{|}{C}}-NH-R^2}$$

(with pyridine-type ring: D–N=N–C(R¹)=C(X)–C(NH–R²)=N–C(NHCH₂CH₂CH₂OCH₂CH₂OC₆H₅))

| Ex. No. | D | X | R¹ | R² | Hue |
|---|---|---|---|---|---|
| 59 | 3-chloro-4-phenylazo (phenyl–N=N–(3-Cl)phenyl) | CN | H | (CH₂)₃O(CH₂)₂OC₆H₅ | red |
| 60 | " | CN | C₂H₅ | " | red |
| 61 | " | CN | C₃H₇(n) | " | red |
| 62 | 2-(phenylsulfonyl)-6-methylphenyl | CN | C₆H₅ | " | golden yellow |
| 63 | " | CONH₂ | H | (CH₂)₃OCH₃ | orange |
| 64 | phenyl–N=N–phenyl | " | H | " | scarlet |
| 65 | phenyl–N=N–(3-Cl)phenyl | " | H | " | red |
| 66 | (2-Cl,5-CH₃)phenyl–N=N–phenyl | CN | CH₃ | " | red |
| 67 | " | CONH₂ | H | " | red |

-continued
| | | | | | | |
|---|---|---|---|---|---|---|
| 68 | 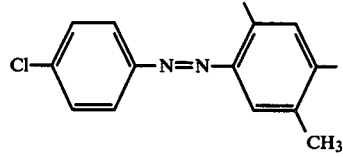 | CN | CH₃ | (CH₂)₃O(CH₂)₂OC₆H₅ | red |
| 69 | " | CN | H | " | red |
| 70 | " | CN | CH₃ | CH₂CH₂OCH₃ | red |
| 71 | " | CONH₂ | H | " | bluish red |
| 72 | 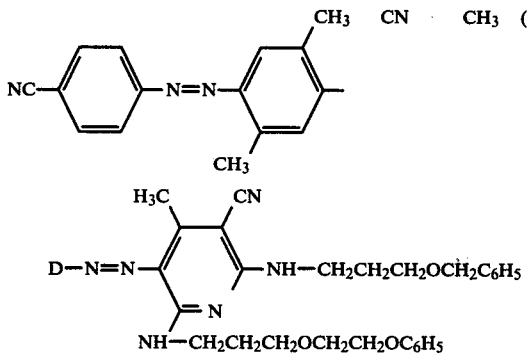 | CN | CH₃ | (CH₂)₃O(CH₂)₂OC₆H₅ | bluish red |
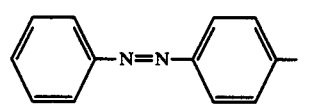
| Ex. No. | D | Hue |
|---|---|---|
| 73 | 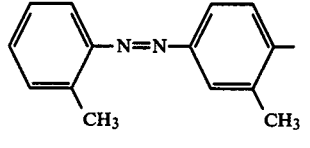 | scarlet |
| 74 | 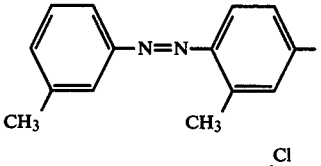 | scarlet |
| 75 | 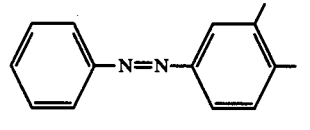 | scarlet |
| 76 | 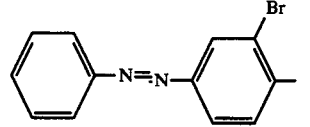 | red |
| 77 | 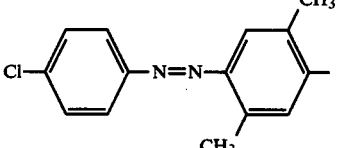 | red |
| 78 | 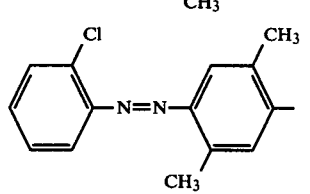 | red |
| 79 |  | red |

-continued
| | | |
|---|---|---|
| 80 | 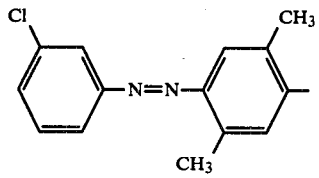 | red |
| 81 | 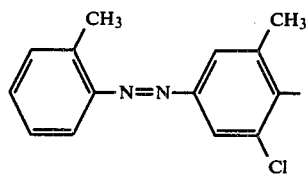 | red |
| 82 | 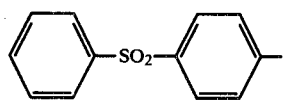 | orange |
| 83 | 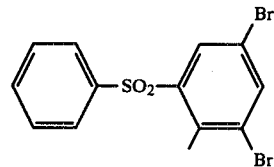 | orange |
| | 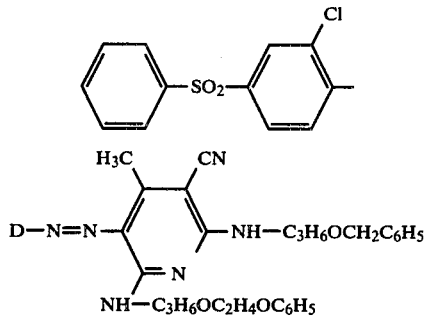 | |
| Ex. No. | D | Hue |
|---|---|---|
| 84 | 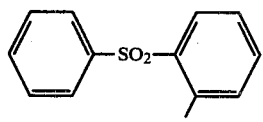 | golden yellow |
| 85 | 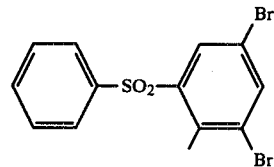 | golden yellow |
| 86 | 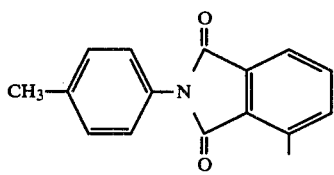 | orange |
| 87 | 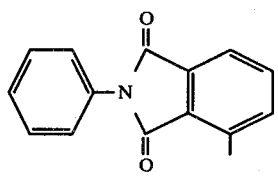 | orange |
| 88 | 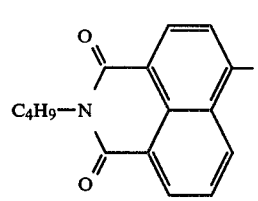 | ruby |

-continued
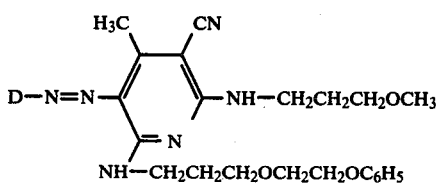
| Ex. No. | D | Hue |
|---|---|---|
| 89 | phenyl-N=N-(p-phenylene)- | scarlet |
| 90 | phenyl-N=N-(2-Cl-4-phenylene)- | red |
| 91 | (2-CH₃-phenyl)-N=N-(2-Cl-5-CH₃-phenylene)- | red |
| 92 | (2-CH₃-phenyl)-N=N-(2-Br-5-CH₃-phenylene)- | red |
| 93 | phenyl-N=N-(2-Br-phenylene)- | red |
| 94 | (4-Cl-phenyl)-N=N-(2,5-di-CH₃-phenylene)- | red |
| 95 | (2-Cl-phenyl)-N=N-(2,5-di-CH₃-phenylene)- | red |
| 96 | (4-Cl-phenyl)-N=N-(2-CH₃-3-Cl-5-CH₃-phenylene)- | red |
| 97 | (4-Cl-phenyl)-N=N-(2-CH₃-3-Br-5-CH₃-phenylene)- | red |

| Ex. No. | | | Hue |
|---|---|---|---|
| 98 | 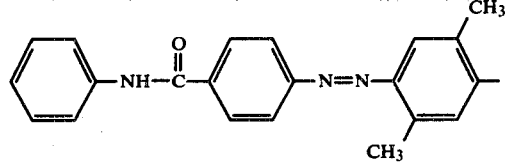 | CH₃ | red |
| 99 | 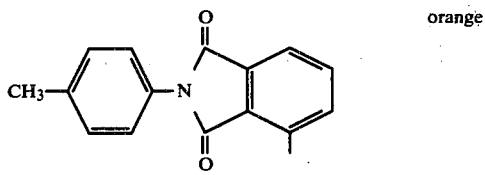 | | orange |
| 100 | 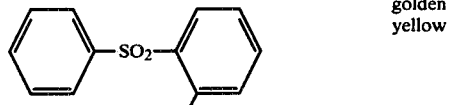 | | golden yellow |
| 101 | 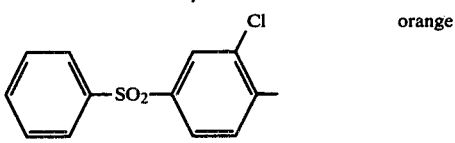 | | orange |
| 102 | 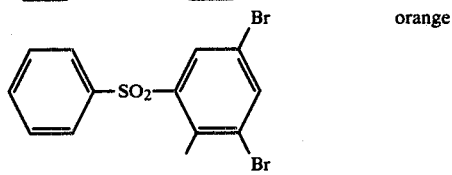 | | orange |
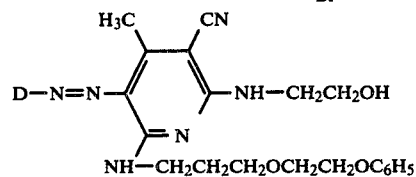
| Ex. No. | D | R | Hue |
|---|---|---|---|
| 103 | 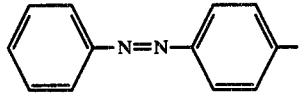 | H | reddish orange |
| 104 | " | CH₃ | reddish orange |
| 105 | " | COC₆H₅ | reddish orange |
| 106 | 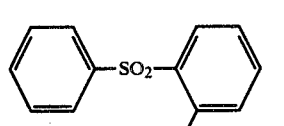 | " | golden yellow |
| 107 | 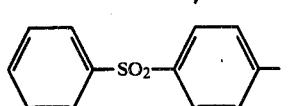 | " | golden yellow |
| 108 | 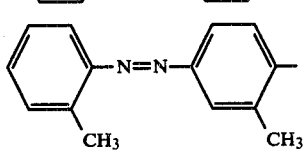 | " | reddish orange |
| 109 | " | H | reddish orange |
| 110 | 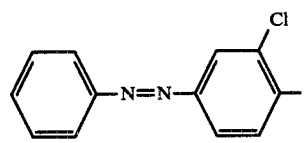 | H | red |

-continued
| Ex. No. | | | Hue |
|---|---|---|---|
| 111 | 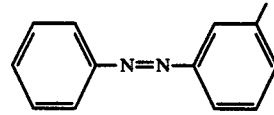 (Cl) | COC₆H₅ | red |
| 112 | " | CH₂CH₂OC(O)C₆H₅ | red |
| 113 | " | CH₃ | red |
| 114 | " | C₂H₅ | red |
| 115 | 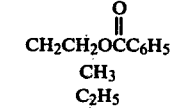 (Br) | " | red |
| 116 | " | CH₃ | red |
| 117 | " | H | red |
| 118 |  | H | yellowish orange |
| 119 | " | CH₃ | yellowish orange |
| 120 | " | C₂H₅ | yellowish orange |
| 121 | 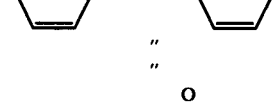 | C₂H₅ | red |
| 122 | " | CH₃ | red |
| 123 | " | H | red |
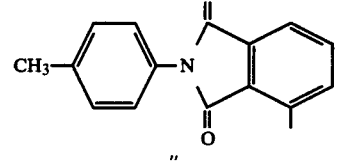
| Ex. No. | D | Hue |
|---|---|---|
| 124 | 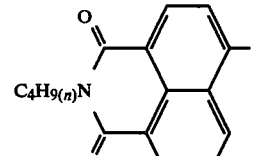 | golden yellow |
| 125 | (Cl substituted analog) | orange |
| 126 | (ortho-methyl analog) | golden yellow |
| 127 | 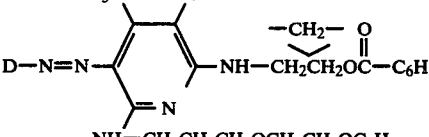 | reddish orange |
| 128 | (Cl substituted azo analog) | red |

-continued
| Ex. No. | Structure | Hue |
|---|---|---|
| 129 | 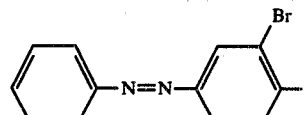 | red |
| 130 | 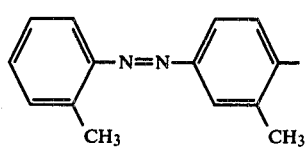 | reddish orange |
| 131 | 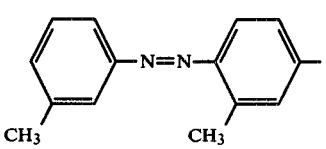 | reddish orange |
| 132 | 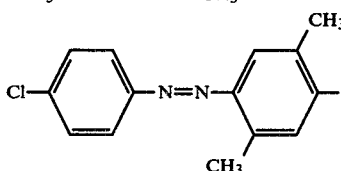 | red |
| 133 | 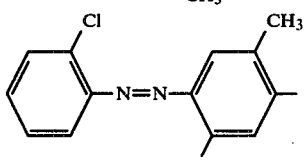 | red |
| 134 | 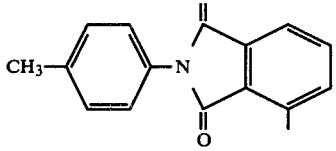 | orange |
| 135 | 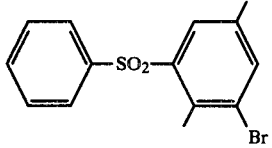 | orange |
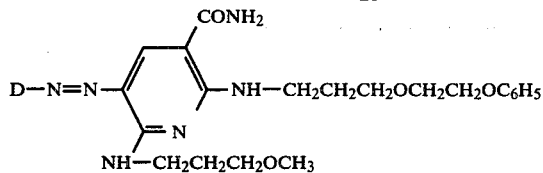
| Ex. No. | D | Hue |
|---|---|---|
| 136 | 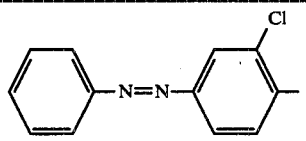 | bluish red |
| 137 | 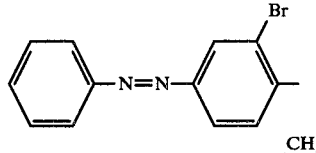 | bluish red |
| 138 | 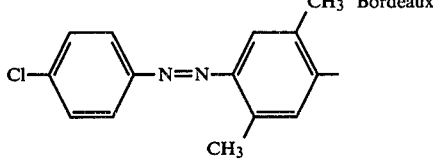 | Bordeaux |

| Ex. No. | D | Hue |
|---|---|---|
| 139 | 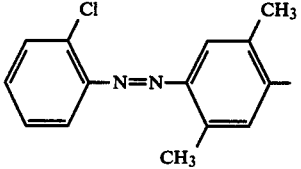 | Bordeaux |
| 140 | 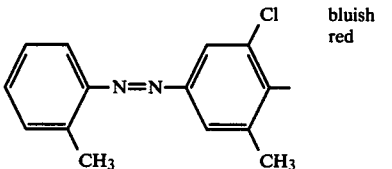 | bluish red |
| 141 | 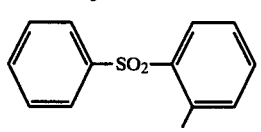 | orange |
| 142 | 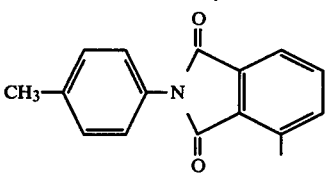 | orange |
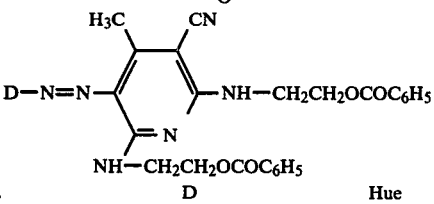
| Ex. No. | D | Hue |
|---|---|---|
| 143 | 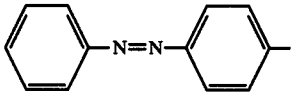 | reddish orange |
| 144 | 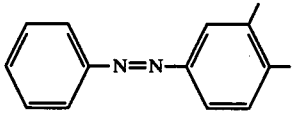 | red |
| 145 | 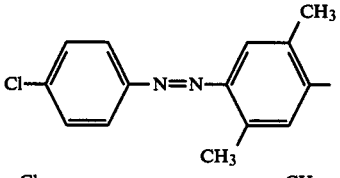 | red |
| 146 | 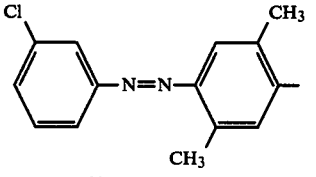 | red |
| 147 | 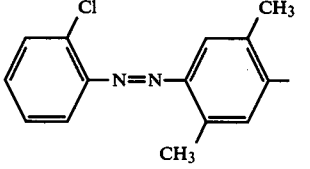 | red |
| 148 | 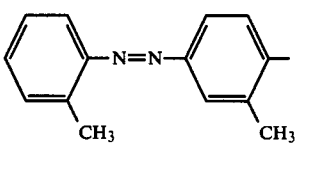 | reddish orange |

-continued

| Ex. No. | Structure | Hue |
|---|---|---|
| 149 | 3-CH₃-C₆H₄-N=N-C₆H₃(2-CH₃)- | reddish orange |
| 150 | C₆H₅-SO₂-C₆H₄(4-)- | golden yellow |
| 151 | C₆H₅-SO₂-C₆H₃(3-Br)- | golden yellow |
| 152 | phenyl-phthalimide (4-methyl substituted on phthalimide ring) | golden yellow |
| 153 | (4-CH₃-C₆H₄)-phthalimide (4-methyl substituted on phthalimide ring) | golden yellow |

$$\text{D-N=N-}\underset{\underset{\text{NH-CH}_2\text{CH}_2\text{CH}_2\text{OCOC}_6\text{H}_5}{\|}}{\overset{\overset{\text{H}_3\text{C}\quad\quad\text{CN}}{|\quad\quad|}}{\text{pyridine ring}}}\text{-NH-CH}_2\text{CH}_2\text{CH}_2\text{OCOC}_6\text{H}_5$$

| Ex. No. | D | Hue |
|---|---|---|
| 154 | C₆H₅-N=N-C₆H₄(4-)- | reddish orange |
| 155 | C₆H₅-N=N-C₆H₃(3-Cl)- | red |
| 156 | 4-Cl-C₆H₄-N=N-C₆H₃(2,5-(CH₃)₂)- | red |
| 157 | 3-Cl-C₆H₄-N=N-C₆H₂(2,4,5-(CH₃)₃)- | red |
| 158 | 2-Cl-C₆H₄-N=N-C₆H₂(2,4,5-(CH₃)₃)- | red |

| Ex. No. | D | Hue |
|---|---|---|
| 159 | ⟨structure: o-tolyl–N=N–m-tolyl⟩ | orange |
| 160 | ⟨structure: m-tolyl–N=N–2,4-dimethylphenyl⟩ | orange |
| 161 | ⟨structure: phenyl–SO₂–p-tolyl⟩ | golden yellow |
| 162 | ⟨structure: phenyl–SO₂–(3-Br-4-methylphenyl)⟩ | golden yellow |
| 163 | ⟨structure: N-phenyl-3-methylphthalimide⟩ | golden yellow |
| 164 | ⟨structure: N-(p-tolyl)-3-methylphthalimide⟩ | golden yellow |

$$\text{D}-N=N-\underset{\underset{NH-CH_2CH_2OCONH-C_6H_5}{|}}{\overset{\overset{H_3C\quad CN}{|\quad|}}{\text{pyridine ring}}}-NH-CH_2CH_2OCONH-C_6H_5$$

| Ex. No. | D | Hue |
|---|---|---|
| 165 | ⟨structure: phenyl–N=N–p-tolyl⟩ | reddish orange |
| 166 | ⟨structure: phenyl–N=N–(3-Cl-4-methylphenyl)⟩ | red |
| 167 | ⟨structure: 4-chlorophenyl–N=N–2,4,5-trimethylphenyl⟩ | red |
| 168 | ⟨structure: 3-chlorophenyl–N=N–2,4,5-trimethylphenyl⟩ | red |

-continued
| | | Hue |
|---|---|---|
| 169 | 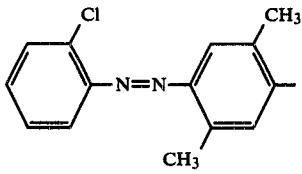 | red |
| 170 | 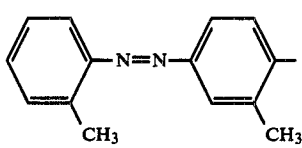 | reddish orange |
| 171 | 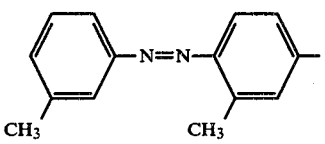 | reddish orange |
| 172 | 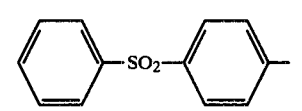 | golden yellow |
| 173 | 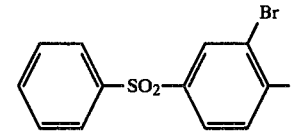 | golden yellow |
| 174 | 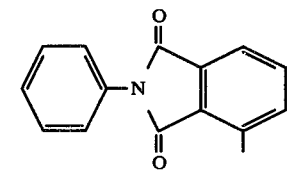 | golden yellow |
| 175 | 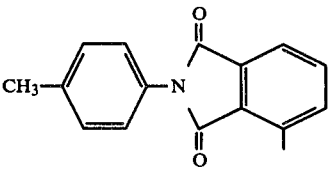 | golden yellow |
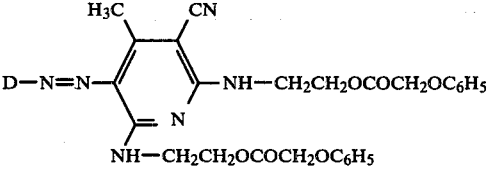
| Ex. No. | D | Hue |
|---|---|---|
| 176 | 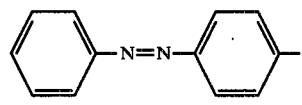 | reddish orange |
| 177 | 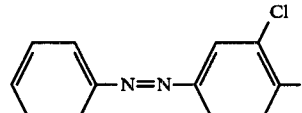 | red |
| 178 | 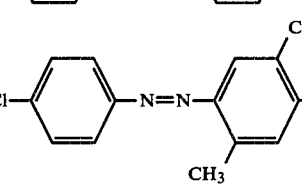 | red |

-continued

| Ex. No. | Structure | Hue |
|---|---|---|
| 179 | (3-Cl-phenyl)-N=N-(2,5-dimethyl-phenyl with CH3) | red |
| 180 | (2-Cl-phenyl)-N=N-(2,5-dimethyl-phenyl with CH3) | red |
| 181 | (2-CH3-phenyl)-N=N-(3-CH3-phenyl) | reddish orange |
| 182 | (3-CH3-phenyl)-N=N-(2-CH3-phenyl) | reddish orange |
| 183 | phenyl-SO2-phenyl | golden yellow |
| 184 | phenyl-SO2-(Br-phenyl) | golden yellow |
| 185 | N-phenyl-(methylphthalimide) | golden yellow |
| 186 | N-(4-CH3-phenyl)-(methylphthalimide) | golden yellow |

Coupling components: 4-methyl-3-cyano-pyridine with $R^1$ at 6-position and $R^2$ at 2-position Diazo component: 2-amino-benzonitrile

| Ex. No. | $R^1$ | $R^2$ | Hue |
|---|---|---|---|
| 187 | HN-CH(OH)-CH2-O-phenyl | HN-CH(OH)-CH2-O-phenyl | yellow |
| 188 | HN-CH2-CH2-O-CH2-CH2-O-phenyl | " | yellow |
| 189 | NH2 | " | yellow |
| 190 | HN-CH2-CH2-O-CH2-CH2-O-phenyl | morpholino | yellow |

| | Coupling components | Diazo component | |
|---|---|---|---|
| 191 | " |  | yellow |
| 192 | " |  | yellow |
| | 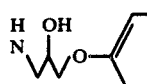 | 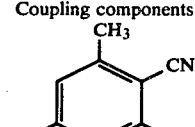 | |
| 193 | NH₂ | 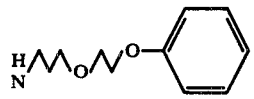 | yellow |
| | Coupling components | Diazo component | |
|---|---|---|---|
| |  | 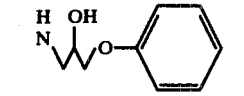 | |
| 194 | 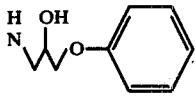 | 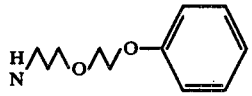 | yellow |
| |  |  | |
| 195 |  | 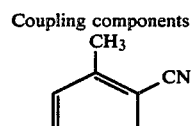 | golden yellow |
| 196 | 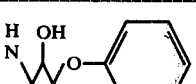 | 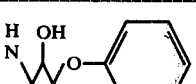 | orange |
| 197 | " | 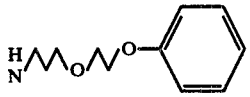 | orange |
| 198 | " |  | orange |
| | Coupling components | Diazo component | |
|---|---|---|---|
| |  | | |
| 199 | | | golden yellow |
| 200 | | | orange |
| 201 | " | | orange |

-continued
| | Coupling components | Diazo component | |
|---|---|---|---|
| | 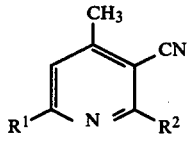 | 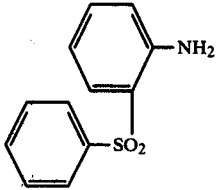 | |
| 202 | 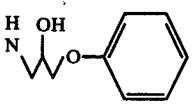 | 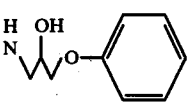 | golden yellow |
| 203 | NH₂ | " | orange |
| 204 |  | 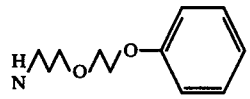 | orange |
| 205 | " |  | orange |
| 206 | " |  | orange |
| 207 | " |  | golden yellow |
| 208 | " |  | golden yellow |
| | Coupling components | Diazo component | |
|---|---|---|---|
| |  | 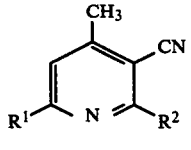 | |
| 209 | 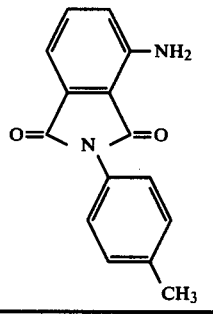 | 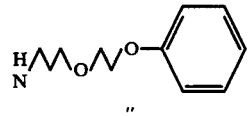 | orange |
| 210 | " |  | orange |
| 211 | " |  | orange |
| 212 | " |  | orange |
| 213 | " |  | orange |
| Coupling components | Diazo component |
|---|---|

| | Coupling Components ![pyridine with CH3, CN, R1, R2] | ![phenyl-N=N-phenyl-NH2] | |
|---|---|---|---|
| 214 | HN-CH2CH2-O-CH2CH2-O-phenyl | HN-CH(OH)-CH2-O-phenyl | reddish orange |
| 215 | HN-CH(OH)-CH2-O-phenyl | HN-CH(OH)-CH2-O-phenyl | " |
| 216 | HN-CH2CH2-O-CH2CH2-O-phenyl | morpholino | " |
| 217 | " | pyrrolidino | red |
| 218 | " | piperidino | " |
| 219 | NH₂ | HN-CH(OH)-CH2-O-phenyl | orange |

| | Coupling Components ![pyridine with CH3, CN, R1, R2] | Diazo component ![phenyl-N=N-(Cl)phenyl-NH2] | |
|---|---|---|---|
| 220 | HN-CH(OH)-CH2-O-phenyl | HN-CH(OH)-CH2-O-phenyl | red |
| 221 | HN-CH2CH2-O-CH2CH2-O-phenyl | " | " |
| 222 | " | 2,6-dimethylmorpholino | " |
| 223 | NH₂ | HN-CH(OH)-CH2-phenyl | " |
| 224 | HN-CH2CH2-O-CH2CH2-O-phenyl | morpholino | " |
| 225 | " | pyrrolidino | " |
| 226 | " | piperidino | " |

-continued

| | Coupling components | Diazo component | |
|---|---|---|---|
| 227 | " | 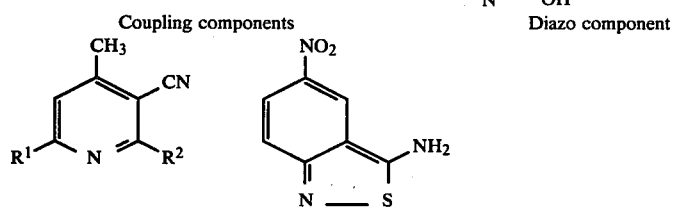 | " |

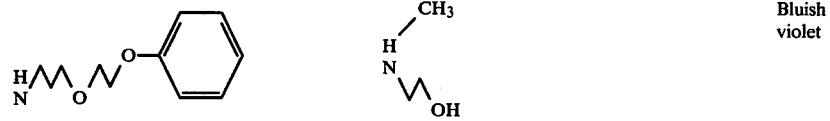

| 228 |  | CH₃ group with N-OH | Bluish violet |
| 229 | " | 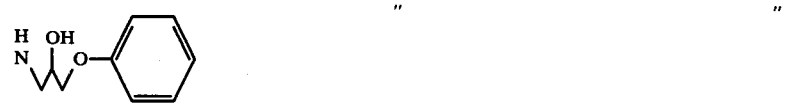 | " |
| 230 | 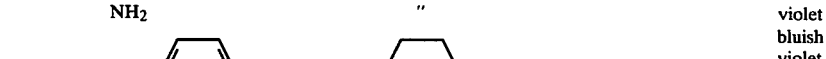 | " | " |
| 231 | NH₂ | " | violet |
| 232 | 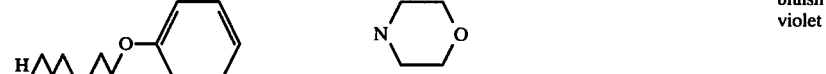 | morpholine | bluish violet |
| 233 | " |  | blue |
| 234 | " | N | " |
| 235 | " | N | " |

Ex. No. 236  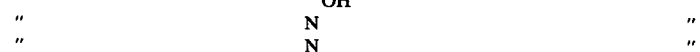  red

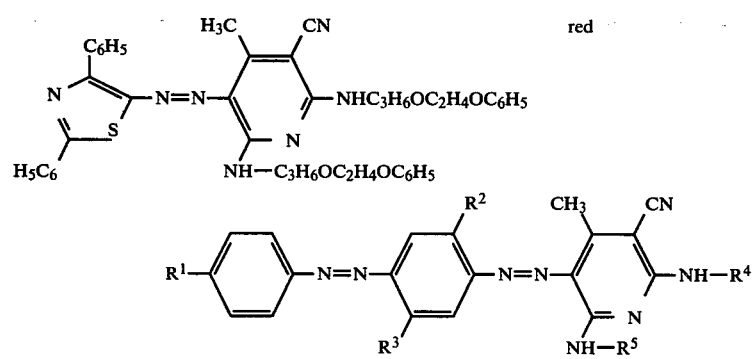

| Ex. No. | R¹ | R² | R³ | R⁴ | R⁵ | Hue |
|---|---|---|---|---|---|---|
| 237 | C₆H₅—OCH₂—CH₂—OCH₂—CH₂—CH₂NH—C(=O)— | CH₃ | CH₃ | CH₂CH₂OCH₃ | CH₂CH₂OCH₃ | red |
| 238 | " | " | " | CH₂CH₂CH₂OCH₃ | CH₂CH₂CH₂OCH₃ | " |
| 239 | " | " | " | " | C₆H₅ | " |
| 240 | C₆H₅—O—CH₂CH₂OCH₂CH₂CH₂NHS(=O)(=O)— | " | " | " | " | " |
| 241 | C₆H₅—CH₂—CH₂—O—C(=O)— | " | " | " | " | " |
| 242 | " | " | " | " | CH₂CH₂CH₂OCH₃ | " |
| 243 | " | H | " | " | " | " |
| 244 | " | Cl | H | " | " | " |

-continued

| | | | | | | | |
|---|---|---|---|---|---|---|---|
| 245 | CH₃—O—CH₂—CH₂—O—C(=O)— | CH₃ | CH₃ | " | C₆H₅ | " |
| 246 | " | " | " | " | (CH₂)₃O(CH₂)₂OC₆H₅ | " |
| 247 | " | " | " | " | " | " |
| 248 | C₆H₅—CH₂—CH₂—NH—C(=O)— | " | " | (CH₂)₃O(CH₂O(C₆H₅ | " | " |
| 249 | (C₂H₅)₂N—C(=O)— | | | | | |
| 250 | (C₄H₉)₂N—S(=O)₂— | " | " | " | " | " |
| 251 | morpholine-N—C(=O)— | " | " | " | " | " |
| 252 | " | " | " | (CH₂)₃OCH₃ | " | " |
| 253 | H | Cl | H | (CH₂)₅—COOH | " | " |
| 254 | HOOC | CH₃ | CH₃ | (CH₂)₃O(CH₂)₂OC₆H₅ | " | " |
| 255 | H | H | H | (CH₂)₅—COOH | " | orange |
| 256 | H | CH₃ | CH₃ | " | " | " |
| 257 | H | Cl | H | (CH₂)₃O(CH₂)₂OC₆H₅ | COCH₃ | scarlet |
| | " | " | " | " | SO₂CH₃ | " |

Coupling component

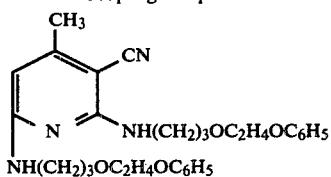

NH(CH₂)₃OC₂H₄OC₆H₅

| | Diazo components | Hue |
|---|---|---|
| 258 | benzotriazole with NH₂ and N-C₆H₅ | yellow |
| 259 | Cl-phenyl with NH₂ and NH cyclic diketone | orange |
| 260 | Cl-phenyl with NH₂ and N—C₆H₅ cyclic diimide | " |
| 261 | H₃C-, NC-, NH₂-phenyl with N—C₆H₅ cyclic diimide | scarlet |
| 262 | H₃C-, NC-, NH₂-phenyl with N—(CH₂)₃OCH₃ cyclic diimide | " |

-continued

263 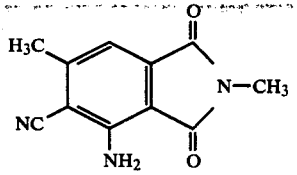

264 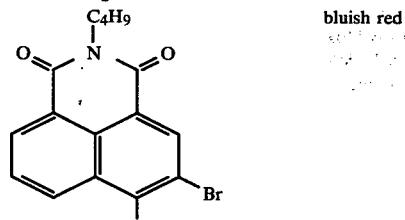  bluish red

265 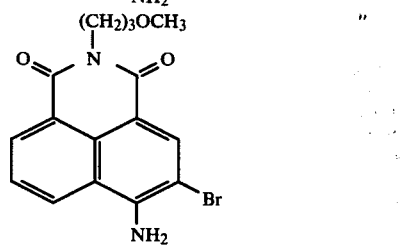  "

266 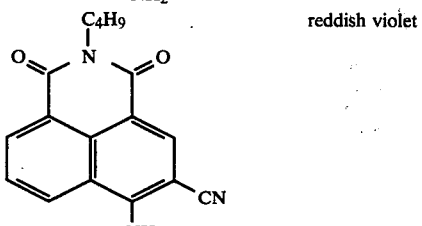  reddish violet

267 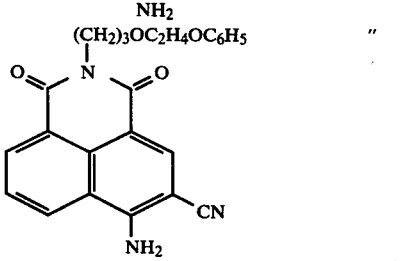  "

268 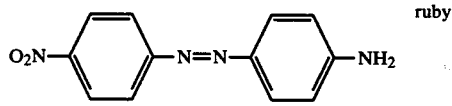  ruby

| 269 | trichloroaniline | yellow |
| 270 | tribromoaniline | yellow |

Coupling component

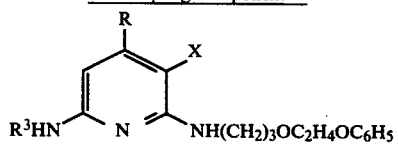

| Ex. | Diazo components | R | X | $R^3$ | Hue |
|---|---|---|---|---|---|
| 271 | 1-aminoanthraquinone | $CH_3$ | CN | H | brown |
| 272 | " | H | CN | H | brown |
| 273 | " | H | $CONH_2$ | H | reddish brown |
| 274 | " | $CH_3$ | CN | $C_6H_5$ | brown |
| 275 | " | H | CN | $C_6H_5$ | brown |
| 276 | " | H | $CONH_2$ | $C_6H_5$ | reddish brown |
| 277 | " | $CH_3$ | CN | $C_6H_4CH_3(p)$ | brown |
| 278 | 1-amino-2-chloroanthra-quinone | $CH_3$ | CN | H | brown |
| 279 | " | $CH_3$ | CN | $C_6H_5$ | brown |
| 280 | " | $CH_3$ | CN | $C_6H_4CH_3(p)$ | brown |
| 281 | " | H | CN | $C_6H_5$ | brown |
| 282 | " | H | $CONH_2$ | $C_6H_5$ | reddish brown |
| 283 | 1-amino-2-methylanthraquin- | $CH_3$ | CN | H | brown |

-continued

| | | | | | |
|---|---|---|---|---|---|
| 284 | one " | CH₃ | CN | C₆H₅ | brown |
| 285 | 3-amino-5-nitro-benzoiso-thiazole-(2,1) | H | CN | H | violet |
| 286 | " | H | CONH₂ | H | navy blue |
| 287 | " | H | CONH₂ | C₆H₅ | blue |
| 288 | 3-amino-5-nitro-7-bromo-benzoisothiazole-(2,1) | H | CONH₂ | C₆H₅ | blue |
| 289 | " | H | CONH₂ | H | navy blue |
| 290 | " | H | CN | H | bluish violet |
| 291 | " | CH₃ | CN | H | orange |

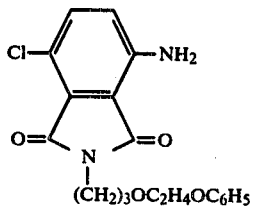

| 292 | " | CH₃ | CN | C₆H₅ | orange |
|---|---|---|---|---|---|
| 293 | " | H | CN | H | orange |
| 294 | " | H | CONH₂ | H | scarlet |
| 295 | " | H | CONH₂ | C₆H₅ | scarlet |
| 296 | " | CH₃ | CN | C₆H₅ | orange |

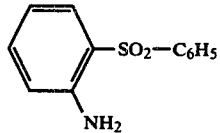

| 297 | " | H | CN | C₆H₅ | orange |
|---|---|---|---|---|---|
| 298 | " | H | CONH₂ | C₆H₅ | scarlet |
| 299 | " | H | CONH₂ | H | orange |
| 300 | " | H | CN | H | red |

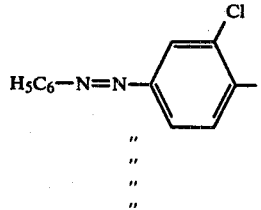

| 301 | " | H | CN | C₆H₅ | red |
|---|---|---|---|---|---|
| 302 | " | H | CONH₂ | C₆H₅ | ruby |
| 303 | " | H | CONH₂ | H | ruby |
| 304 | " | H | CN | (CH₂)₃OC₂H₄OC₆H₅ | red |
| 305 | " | H | CONH₂ | H | ruby |

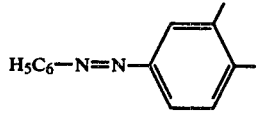

| 306 | " | H | CN | H | red |
|---|---|---|---|---|---|
| 307 | " | H | CN | C₆H₅ | red |
| 308 | " | CH₃ | CN | (CH₂)₃OC₂H₄OC₆ | red |
| 309 | " | CH₃ | CN | H | orange |

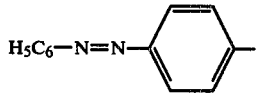

| 310 | " | H | CN | H | orange |
|---|---|---|---|---|---|
| 311 | " | H | CONH₂ | H | scarlet |

Coupling components

| Ex. | Diazo components | R³ | Z | Hue |
|---|---|---|---|---|
| 312 | 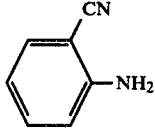 | H | (CH₂)₃OC₂H₄OC₆H₅ | orange |
| 313 | " | C₆H₅ | " | orange |
| 314 | 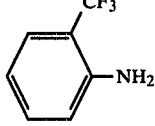 | H | " | orange |

-continued

| | | | | |
|---|---|---|---|---|
| 315 | 3,5-bis(CF₃)aniline (CF₃, NH₂, CF₃) | H | " | orange |
| 316 | 4-amino-3-chloro-H₃CO₂S-benzene | H | " | scarlet |
| 317 | 2-amino-SO₂C₆H₅-benzene | H | " | scarlet |
| 318 | 3-aminophthalic p-tolyl-imide | H | " | red |
| 319 | 1-aminoanthraquinine | H | " | reddish brown |
| 320 | aminoazobenzene | H | " | ruby |
| 321 | chloroaminoazobenzene | H | " | reddish violet |
| 322 | bromoaminoazobenzene | H | " | reddish violet |
| 323 | 3-amino-5-nitrobenziso-thiazole-(2,1) | H | " | navy blue |
| 324 | " | C₆H₅ | " | navy blue |
| 325 | " | C₆H₄CH₃(p) | " | navy blue |
| 326 | 3-amino-5-nitro-7-bromo-benzoisothiazole-(2,1) | H | " | navy blue |
| 327 | " | C₆H₅ | " | navy blue |
| 328 | 4-aminoazobenzene | H | H | orange |
| 329 | 4-amino-3-chloroazobenzene | H | H | scarlet |

The following are also suitable as dyes:

| Example | | Hue |
|---|---|---|
| 330 | C₆H₅—N=N—(2-Cl-C₆H₃)—N=N—pyridine(CH₃, CN, NH₂, NH₂) | orange |
| 331 | H₅C₆OC₂H₄O(CH₂)₃NHO₂S—(2,5-diCl-C₆H₂)—N=N—pyridine with 2,4,6-trimethylanilino groups, CH₃, CN | yellow |
| 332 | 1-anthraquinonyl—N=N—pyridine(CH₃, CN) with p-tolylamino groups | brown |
| 333 | C₆H₅—N=N—C₆H₄—N=N—pyridine(CH₃, CN, NHC₆H₅, NHC₆H₅) | red |

-continued
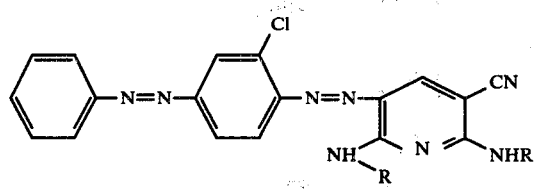
| Example | R | Hue |
|---|---|---|
| 334 | C$_6$H$_5$ | red |
| 335 | C$_6$H$_4$CH$_3$(o) | red |
| 336 | C$_6$H$_4$CH$_3$(p) | red |
| 337 | | red |
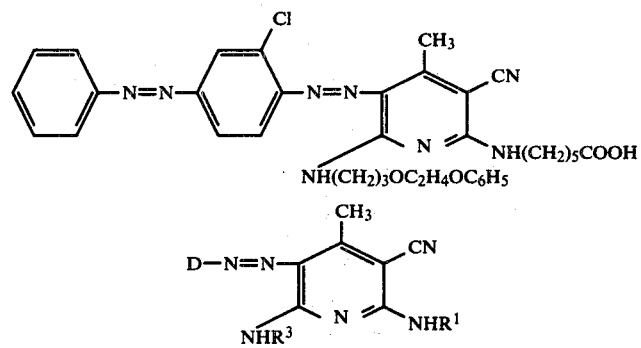
| Example | D | R$^1$ | R$^3$ | Hue |
|---|---|---|---|---|
| 338 | 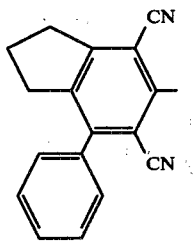 | (CH$_2$)$_3$O(CH$_2$)$_2$OC$_6$H$_5$ | (CH$_2$)$_3$(CH$_2$)$_2$OC$_6$H$_5$ | orange |
| 339 | 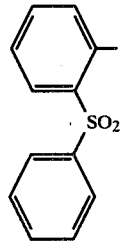 | " | " | orange |
| 340 | 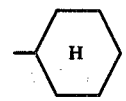 | " | 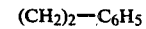 | orange |
| 341 | " | " | 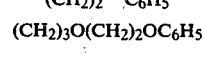 | orange |
| 342 | " | " | (CH$_2$)$_2$—C$_6$H$_5$ | orange |
| 343 | " | " | (CH$_2$)$_3$O(CH$_2$)$_2$OC$_6$H$_5$ | orange |

-continued

| Example | D | R¹ | R² | Hue |
|---|---|---|---|---|
| 344 | ![C4H9-CHCH2O(CH2)3- on 2,5-dichlorophenyl-SO2NH; with C2H5] | (CH₂)₂OCH₃ | (CH₂)₂OCH₃ | orange |
| 345 | " | (CH₂)₃OCH₃ | (CH₂)₃OCH₃ | orange |
| 346 | " | (CH₂)₃O(CH₂)₂OC₆H₅ | (CH₂)₃O(CH₂)₂OC₆H₅ | orange |
| 347 | C₆H₅–O(CH₂)₂O(CH₂)₃– on 2,5-dichlorophenyl-SO₂NH | (CH₂)₂OCH₃ | (CH₂)₂OCH₃ | orange |
| 348 | " | (CH₂)₃OCH₃ | (CH₂)₃OCH₃ | orange |
| 349 | " | (CH₂)₃O(CH₂)₂OC₆H₅ | (CH₂)₃O(CH₂)₂OC₆H₅ | orange |
| 350 | CH₃–NHO₂S– on 2,5-dichlorophenyl | (CH₂)₃O(CH₂)₂OC₆H₅ | (CH₂)₃O(CH₂)₂OC₆H₅ | orange |
| 351 | CH₃O(CH₂)₂–NHO₂S– on 2,5-dichlorophenyl | " | " | orange |
| 352 | tetrahydrofuran-O₂S– on 3-chlorophenyl | " | " | orange |
| 353 | (CH₃)₂–NHO₂S– on 3-chlorophenyl | " | " | orange |
| 354 | CH₃–NHO₂S– on 3-chlorophenyl | " | " | orange |
| 355 | (CH₃)₂–NHO₂S– on 2,5-dichlorophenyl | " | " | orange |
| 356 | CH₃O(CH₂)₂–NHO₂S– on 3-chlorophenyl | " | " | orange |
| 357 | pyrrolidine-N–O₂S– on 3-chlorophenyl | " | " | orange |
| 358 | C₆H₅–O(CH₂)₂O(CH₂)₃–NHO₂S– on 3-chlorophenyl | " | " | orange |

-continued

| Example | D | R¹ | R³ | Hue |
|---|---|---|---|---|
| 359 | " | NH₂ | " | orange |
| 360 | " | (CH₂)₂OCH₃ | (CH₂)₂OCH₃ | orange |
| 361 | " | (CH₂)₃OCH₃ | (CH₂)₃OCH₃ | orange |
| 362 | [phenyl-N=N-(3-chloro-4-methylphenyl)] | (CH₂)₃O(CH₂)₂OC₄H₉ | (CH₂)₃O(CH₂)₂OC₄H₉ | red |
| 363 | [anthraquinone-1-yl] | " | " | brown |
| 364 | [(CH₃)₂HNO₂S-phenyl-Cl-CH₃] | " | " | orange |
| 365 | [phenyl-SO₂-phenyl-CH₃] | " | " | orange |
| 366 | [N-(p-tolyl)phthalimide-CH₃] | " | " | orange |
| 367 | [O(CH₂)₂O(CH₂)₃HNO₂S-(2,5-dichloro-4-methylphenyl), OC₆H₅] | " | " | orange |

$$\text{Structure: } T^5\text{-}T^3\text{-phenyl-N=N-(2,5-dimethylphenyl)-N=N-(pyridine with CH}_3\text{, CN, NH-R}^1\text{, NH-R}^3\text{)}$$
with T⁴ on the phenyl ring

| Example | T³ | T⁴ | T⁵ | R³ | R¹ | Hue |
|---|---|---|---|---|---|---|
| 368 | —SO₂NH(CH₂)₃O(CH₂)₂OC₆H₅ | H | H | (CH₂)₂OCH₃ | (CH₂)₂OCH₃ | red |
| 369 | " | " | " | (CH₂)₃OCH₃ | (CH₂)₃OCH₃ | red |
| 370 | " | " | " | (CH₂)₃O(CH₂)₂OC₆H₅ | (CH₂)₃O(CH₂)₂OC₆H₅ | red |
| 371 | " | " | " | (CH₂)₃O(CH₂)₂OC₆H₅ | (CH₂)₃O(CH₂)₂OC₆H₅ | red |

-continued

| | | | | | | |
|---|---|---|---|---|---|---|
| 372 | " | Cl | " | " | " | red |
| 373 | " | Cl | " | (CH₂)₂OCH₃ | (CH₂)₂OCH₃ | red |
| 374 | " | Cl | " | (CH₂)₃OCH₃ | (CH₂)₃OCH₃ | red |
| 375 | —CONH(CH₂)₃O(CH₂)₂OC₆H₅ | H | " | " | " | red |
| 376 | " | H | " | (CH₂)₂OCH₃ | (CH₂)₂OCH₃ | red |
| 377 | " | H | " | (CH₂)₃O(CH₂)₂OC₆H₅ | (CH₂)₃O(CH₂)₂OC₆H₅ | red |
| 378 | Cl | Cl | SO₂NH(CH₂)₃OC₂H₄OC₆H₅ | | | red |

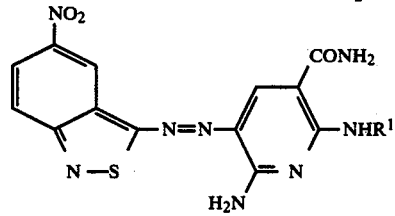

| Example | R¹ | Hue |
|---|---|---|
| 379 | —(CH₂)₂—⟨cyclohexyl⟩H | bluish violet |
| 380 | —⟨C₆H₄⟩—O(CH₂)₂OC₆H₅ | blue |
| 381 | —⟨C₆H₄⟩—O(CH₂)₂O(CH₂)₂OCH₃ | blue |
| 382 | —(CH₂)₃O(CH₂)₂OC₄H₉ | bluish violet |
| 383 | (CH₂)₃OC₂H₄O—⟨cyclohexyl⟩H | blue |

Structure:

D—N=N—C(R)=C(X)—C(=N—)—NH(CH₂)₂OC₂H₄O—⟨cyclohexyl⟩H
with NH(CH₂)₃OC₂H₄O—⟨cyclohexyl⟩H substituent

| Example | D | R | X | Hue |
|---|---|---|---|---|
| 384 | C₆H₅—N=N—C₆H₄— | CH₃ | CN | scarlet |
| 385 | " | H | CN | scarlet |
| 386 | " | H | CONH₂ | red |
| 387 | C₆H₅—N=N—(Cl)C₆H₃— | Cl CH₃ | CN | red |
| 388 | " | H | CN | red |
| 389 | " | H | CONH₂ | ruby |
| 390 | (Cl)C₆H₄— | CH₃ | CN | yellow |
| 391 | " | H | CONH₂ | orange |
| 392 | H₃CO₂S—(Cl)C₆H₃— | CH₃ | CN | yellowish orange |

| No. | | | | | | | shade |
|---|---|---|---|---|---|---|---|
| 393 | " | | H | | CONH$_2$ | | reddish orange |
| 394 | 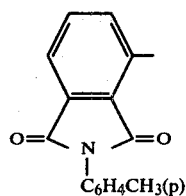 | | CH$_3$ | | CN | | orange |
| 395 | " | | H | | CONH$_2$ | | scarlet |

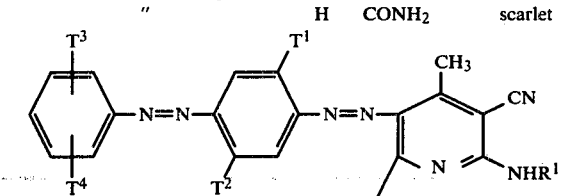

| No. | T$^4$ | T$^3$ | T$^1$ | T$^2$ | R$^3$ | R$^1$ | shade |
|---|---|---|---|---|---|---|---|
| 396 | H | H | H | H | C$_4$H$_9$(n) | C$_4$H$_9$(n) | orange |
| 397 | 4-Cl | H | CH$_3$ | H | C$_3$H$_7$(n) | C$_3$H$_7$(n) | red |
| 398 | 4-Cl | H | CH$_3$ | CH$_3$ | C$_2$H$_5$ | C$_2$H$_5$ | red |
| 399 | 4-Cl | H | CH$_3$ | H | " | " | red |
| 400 | 2-Cl | H | CH$_3$ | CH$_3$ | " | " | red |
| 401 | 4-Cl | H | CH$_3$ | H | C$_4$H$_9$(n) | C$_4$H$_9$(n) | red |
| 402 | H | H | Br | H | " | " | red |
| 403 | 3-Cl | H | CH$_3$ | CH$_3$ | (CH$_2$)$_3$OCH$_3$ | (CH$_2$)$_3$OCH$_3$ | red |
| 404 | 3-Cl | H | CH$_3$ | CH$_3$ | (CH$_2$)$_2$OCH$_3$ | (CH$_2$)$_2$OCH$_3$ | red |
| 405 | 4-Cl | H | CH$_3$ | CH$_3$ | " | " | red |
| 406 | 4-Cl | H | CH$_3$ | CH$_3$ | (CH$_2$)$_3$OCH$_3$ | (CH$_2$)$_3$OCH$_3$ | red |
| 407 | 4-Cl | H | CH$_3$ | H | " | " | red |
| 408 | 4-Cl | H | CH$_3$ | H | (CH$_2$)$_2$OCH$_3$ | (CH$_2$)$_2$OCH$_3$ | red |
| 409 | H | H | Cl | H | C$_4$H$_9$(n) | C$_4$H$_9$(n) | red |
| 410 | 2-Cl | H | CH$_3$ | H | C$_2$H$_5$ | C$_2$H$_5$ | red |
| 411 | 2-Cl | H | CH$_3$ | H | (CH$_2$)$_2$OCH$_3$ | (CH$_2$)$_2$OCH$_3$ | red |
| 412 | 2-Cl | H | CH$_3$ | H | (CH$_2$)$_3$OCH$_3$ | (CH$_2$)$_3$OCH$_3$ | red |
| 413 | 3-Cl | H | CH$_3$ | H | (CH$_2$)$_3$OCH$_3$ | (CH$_2$)$_3$OCH$_3$ | red |
| 414 | H | 3-CONH—C$_2$H$_4$OCH$_3$ | CH$_3$ | CH$_3$ | C$_2$H$_4$OCH$_3$ | C$_2$H$_4$OCH$_3$ | red |
| 415 | H | " | CH$_3$ | CH$_3$ | " | " | red |
| 416 | H | 3-CONH(CH)$_3$OCH$_3$ | CH$_3$ | CH$_3$ | C$_2$H$_5$ | C$_2$H$_5$ | red |
| 417 | H | 4-C$_6$H$_5$O(CH$_2$)$_3$NHCO | " | CH$_3$ | H | C$_4$H$_9$ | red |
| 418 | H | 4-C$_2$H$_5$O$_2$C— | CH$_3$ | CH$_3$ | C$_2$H$_5$ | C$_2$H$_5$ | dark red |
| 419 | H | 4-C$_2$H$_5$O$_2$C— | CH$_3$ | CH$_3$ | H | C$_4$H$_9$ | red |
| 420 | H | 4-CH$_3$O(CH$_2$)$_2$NHCO— | CH$_3$ | CH$_3$ | (CH$_2$)$_2$OCH$_3$ | (CH$_2$)$_2$OCH$_3$ | red |
| 421 | H | 4-C$_2$H$_5$O$_2$C— | CH$_3$ | CH$_3$ | (CH$_2$)$_2$OCH$_3$ | " | dark red |
| 422 | H | " | CH$_3$ | CH$_3$ | (CH$_2$)$_3$OCH$_3$ | (CH$_2$)$_3$OCH$_3$ | " |
| 423 | H | 4-CH$_3$O(CH$_2$)$_2$NHCO— | CH$_3$ | CH$_3$ | (CH$_2$)$_3$OCH$_3$ | (CH$_2$)$_3$OCH$_3$ | red |
| 424 | H | 4-C$_3$H$_7$(n)O$_2$C— | CH$_3$ | CH$_3$ | C$_2$H$_5$ | C$_2$H$_5$ | red |
| 425 | H | 4-C$_3$H$_7$(i)O$_2$C— | CH$_3$ | CH$_3$ | C$_2$H$_5$ | C$_2$H$_5$ | red |
| 426 | H | 3-CONH—C$_3$H$_7$(n) | " | " | (CH$_2$)$_2$OCH$_3$ | (CH$_2$)$_2$OCH$_3$ | red |
| 427 | H | 4-CONH—C$_3$H$_7$(n) | " | " | " | " | red |
| 428 | H | 4-SO$_2$NHC$_4$H$_9$(n) | " | " | C$_2$H$_5$ | C$_2$H$_5$ | red |
| 429 | H | " | " | " | C$_3$H$_{17}$ | C$_3$H$_{17}$ | red |
| 430 | H | " | " | " | (CH$_2$)$_2$OCH$_3$ | (CH$_2$)$_2$OCH$_3$ | red |
| 431 | H | 4-SO$_2$N(C$_2$H$_5$)$_2$ | " | " | C$_2$H$_5$ | C$_2$H$_5$ | red |
| 432 | H | " | " | " | (CH$_2$)$_2$OCH$_3$ | (CH$_2$)$_2$OCH$_3$ | red |
| 433 | H | " | " | " | (CH$_2$)$_3$OCH$_3$ | (CH$_2$)$_3$OCH$_3$ | red |
| 434 | H | H | " | " | H | H | red |
| 435 | H | H | Cl | " | (CH$_2$)$_2$OCH$_3$ | (CH$_2$)$_2$OCH$_3$ | red |
| 436 | H | H | Br | " | " | " | red |
| 437 | H | H | H | " | " | " | red |
| 438 | H | 3-SO$_2$N⟨C$_5$H$_{10}$⟩ | H | " | " | " | red |
| 439 | H | 4-SO$_2$N⟨C$_5$H$_{10}$⟩ | H | " | " | " | red |
| 440 | H | " | CH$_3$ | CH$_3$ | " | " | red |

We claim:

1. Uniformly dyed water-swellable cellulosic fibers, said fibers being fast to washing, dry cleaning, sublimation and light and having been produced by contacting water-swellable cellulose fibers subsequently or concomitantly with water, ethylene glycol or a derivative thereof and, while the fibers are still swollen, an essentially water-insoluble dye of the formula

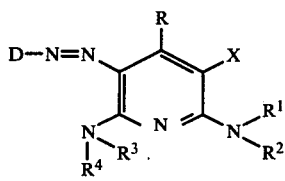

in which
D is phenyl substituted by cyano, trifluoromethyl, methyl, fluoro, chloro, bromo, $C_1$ to $C_4$ alkylsulfonyl, phenylsulfonyl,

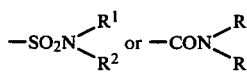

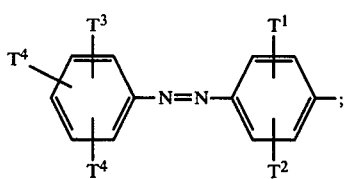

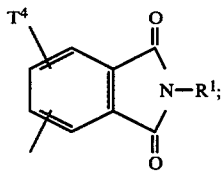

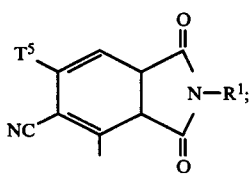

anthraquinonyl; anthraquinonyl substituted by methyl, chloro, bromo or carboxyl; or benzoisothiazolyl substituted by nitro, chloro or bromo;
R is hydrogen, $C_1$ to $C_3$ alkyl or phenyl;
X is cyano, carbamoyl or

$R^1$ and $R^3$ independently of one another are hydrogen; $C_1$ to $C_8$ alkyl;
$C_2$ to $C_8$ alkyl substituted by hydroxy, $C_1$ to $C_8$ alkoxy, phenoxy, tolyloxy, cyclohexyloxy, benzyloxy, β-phenylethoxy, carboxyl, carboxylic ester with a total of 2 to 9 carbon atoms, carboxylic acyloxy with a total of 1 to 11 carbon atoms, $C_1$ to $C_8$ alkylaminocarbonyloxy, benzoylaminocarbonyloxy, tolylaminocarbonyloxy, chlorophenylaminocarbonyloxy, dichlorophenylaminocarbonyloxy or pyrrolidonyl; cyclohexyl, norbornyl; phenyl-$C_1$ to $C_4$-alkyl; tolyl-$C_1$ to $C_4$-alkyl; β-phenyl-β-hydroxy-ethyl; phenyl; phenyl substituted by fluoro, chloro, bromo, methyl, trifluoromethyl, ethyl, methoxy, ethoxy or pyrrolidonyl; $CH_2CH_2OCH_2CH_2OH$; or $(CH_2)_3(OC_2H_4)_nOB$;
n is zero, 1 or 2;

B is hydrogen, $C_1$ to $C_4$ alkyl, cyclohexyl, benzyl, phenylethyl, phenyl or tolyl;
$R^2$ and $R^4$ independently of one another are hydrogen or $C_1$ to $C_4$ alkyl;
$R^1$ to $R^2$ together with the nitrogen are pyrrolidino, piperidino, morpholino or hexamethyleneimino;
$T^1$ is hydrogen, chloro, bromo or methyl;
$T^2$ is hydrogen or methyl;
$T^3$ is hydrogen,

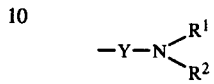

or $COOB^1$;
$B^1$ is hydrogen, $C_1$ to $C_8$ alkyl, phenyl-$C_1$ to $C_4$-alkyl or $(OC_2H_4)_nOB$;
Y is $-SO_2-$ or $-CO-$;
$T^4$ is hydrogen or chloro; and
$T^5$ is hydrogen, methyl or ethyl.

2. The fibers according to claim 1 wherein in the formula D is phenyl-substituted cyano, trifluoromethyl, fluoro, chloro, bromo, methylsulfonyl, phenylsulfonyl or

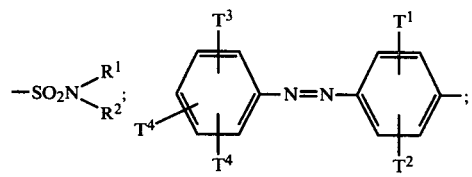

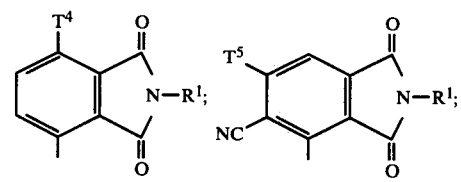

anthraquinonyl-1; or benzisothiazolyl substituted by nitro or bromo, $R^1$, $R^2$ and $T^1$ to $T^5$ having the meanings given for claim 1.

3. The fibers according to claim 1 wherein in the formula R is hydrogen or methyl.

4. The fibers according to claim 1 wherein in the formula R is methyl.

5. The fibers according to claim 1 wherein in the formula X is cyano or carbamoyl.

6. The fibers according to claim 1 wherein in the formula $R^2$ and $R^4$ are hydrogen.

7. The fibers according to claim 1 wherein in the formula $R^1$ and $R^3$ independently of one another are a phenyl ring containing substituents as defined in claim 1 and $R^2$ and $R^4$ are hydrogen.

8. The fibers according to claim 1 wherein in the formula
R is hydrogen or methyl,
X is cyano or carbamoyl,
$R^2$ and $R^4$ are hydrogen,
$R^1$ and $R^3$ independently of one another are a phenyl ring containing substituents as defined in claim 1 and
D has the meanings given in claim 1.

9. The fibers according to claim 1, wherein the fibers are cotton fibers.

10. The fibers according to claim 1, admixed or blended with synthetic fibers.

11. The fibers of claims 10, wherein the synthetic fibers are polyester fibers.

* * * * *